(12) United States Patent
Akkarakaran et al.

(10) Patent No.: US 10,492,151 B2
(45) Date of Patent: Nov. 26, 2019

(54) POWER CONTROL IN NEW RADIO SYSTEMS

(71) Applicant: QUALCOMM Incorporated, San Diego, CA (US)

(72) Inventors: Sony Akkarakaran, Poway, CA (US); Yi Huang, San Diego, CA (US); Peter Gaal, San Diego, CA (US); Xiao Feng Wang, San Diego, CA (US); Tao Luo, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/002,928

(22) Filed: Jun. 7, 2018

(65) Prior Publication Data

US 2018/0359711 A1 Dec. 13, 2018

Related U.S. Application Data

(60) Provisional application No. 62/517,815, filed on Jun. 9, 2017.

(51) Int. Cl.
*H04W 52/32* (2009.01)
*H04W 52/14* (2009.01)
(Continued)

(52) U.S. Cl.
CPC ....... *H04W 52/325* (2013.01); *H04W 52/146* (2013.01); *H04W 52/242* (2013.01);
(Continued)

(58) Field of Classification Search
CPC ............. H04W 52/146; H04W 52/242; H04W 52/267; H04W 52/325; H04W 52/362; H04W 52/38; H04W 52/42; H04W 52/48
(Continued)

(56) References Cited

U.S. PATENT DOCUMENTS 10,015,750 B2 * 7/2018 Kim .................... H04W 52/286
2002/0028691 A1 * 3/2002 Moulsley .............. H04L 1/0001
455/522

(Continued)

FOREIGN PATENT DOCUMENTS

WO WO2018027540 A1 2/2018
WO WO2018064009 A1 4/2018

OTHER PUBLICATIONS

"3rd Generation Partnership Project; Technical Specification Group Radio Access Network; Evolved Universal Terrestrial Radio Access (E-UTRA); Physical layer Procedures (Release 14)", 3GPP Standard; Technical Specification; 3GPP TS 36.213, 3rd Generation Partnership Project (3GPP), Mobile Competence Centre; 658, Route Des Luciles; F-06921, Sophia-Antipolis Cedex; France, vol. RAN WG1, No. V14.2.8, Mar. 23, 2017 (Mar. 23, 2017), pp. 8-49, XP851291434, [retrieved on Mar. 23, 2017].

(Continued)

*Primary Examiner* — Tan H Trinh
(74) *Attorney, Agent, or Firm* — Holland & Hart LLP

(57) ABSTRACT

Methods, systems, and devices for power control in New Radio (NR) systems are described. In one example, a user equipment (UE) may determine a transmit power for a control channel based on an effective code rate of control information to be transmitted in the control channel. In another example, the UE may be configured to use a different transmit power for repeated transmissions of control information in a control channel. In yet another example, the UE may be configured to determine a transmit power for a transmission in a time interval or scale a transmission in a time interval based on a priority of the transmission relative to other transmissions scheduled in the time interval. In yet another example, the UE may be configured to determine respective transmit powers for (Continued)

uplink transmissions multiplexed differently using different open-loop parameters.

28 Claims, 19 Drawing Sheets

(51) Int. Cl.
*H04W 52/42* (2009.01)
*H04W 52/24* (2009.01)
*H04W 52/48* (2009.01)
*H04W 52/36* (2009.01)
*H04W 52/26* (2009.01)
*H04W 52/38* (2009.01)

(52) U.S. Cl.
CPC ....... *H04W 52/267* (2013.01); *H04W 52/362* (2013.01); *H04W 52/38* (2013.01); *H04W 52/42* (2013.01); *H04W 52/48* (2013.01)

(58) Field of Classification Search
USPC ........ 455/516, 455, 522, 517; 370/278, 328, 370/329, 342; 380/270
See application file for complete search history.

(56) References Cited

U.S. PATENT DOCUMENTS

| | | | | |
|---|---|---|---|---|
| 2002/0042283 | A1* | 4/2002 | Moulsley | H04L 1/0001 455/517 |
| 2006/0034240 | A1* | 2/2006 | Kwak | H04L 1/16 370/342 |
| 2006/0221885 | A1* | 10/2006 | Nagaraj | H04L 1/0015 370/328 |
| 2008/0159184 | A1* | 7/2008 | Niwano | H04W 52/346 370/278 |
| 2009/0016263 | A1* | 1/2009 | Kishigami | H04B 7/04 370/328 |
| 2012/0033629 | A1* | 2/2012 | Yajima | H04W 52/146 370/329 |
| 2012/0039294 | A1* | 2/2012 | Yan | H04W 36/06 370/329 |
| 2014/0050319 | A1* | 2/2014 | Pang | H04W 76/10 380/270 |
| 2015/0036668 | A1* | 2/2015 | Kanamarlapudi | H04W 52/146 370/336 |
| 2016/0044599 | A1* | 2/2016 | Damnjanovic | H04W 52/04 455/522 |
| 2016/0105886 | A1* | 4/2016 | Li | H04W 52/08 370/329 |
| 2016/0174234 | A1* | 6/2016 | Wang | H04B 17/24 370/329 |
| 2016/0255594 | A1* | 9/2016 | Vajapeyam | H04W 52/346 455/522 |
| 2016/0262109 | A1* | 9/2016 | Chen | H04W 4/70 |
| 2016/0295574 | A1* | 10/2016 | Papasakellariou | H04L 1/0009 |
| 2017/0265148 | A1 | 9/2017 | Balasubramanian et al. | |
| 2018/0076942 | A1 | 3/2018 | Nory et al. | |
| 2018/0103428 | A1 | 4/2018 | Jiang et al. | |
| 2018/0110042 | A1* | 4/2018 | Chen | H04L 5/0055 |
| 2018/0132245 | A1* | 5/2018 | Yerramalli | H04W 52/221 |
| 2018/0160400 | A1* | 6/2018 | Liu | H04L 5/001 |
| 2018/0220441 | A1* | 8/2018 | Akula | H04W 72/1268 |
| 2018/0227912 | A1* | 8/2018 | Chen | H04L 5/001 |
| 2018/0309496 | A1* | 10/2018 | Lee | H04L 5/0044 |
| 2018/0324771 | A1* | 11/2018 | Hosseini | H04W 72/042 |
| 2018/0332566 | A1* | 11/2018 | You | H04L 5/00 |
| 2018/0343148 | A1* | 11/2018 | Hosseini | H04W 52/346 |
| 2019/0028975 | A1* | 1/2019 | Nory | H04L 1/1854 |

OTHER PUBLICATIONS

Partial International Search Report—PCT/US2018/036745—ISA/EPO—dated Sep. 17, 2018.
International Search Report and Written Opinion—PCT/US2018/036745—ISA/EPO—dated Nov. 13, 2018.

\* cited by examiner

POWER CONTROL IN NEW RADIO SYSTEMS

CROSS REFERENCES

The present Application for Patent claims the benefit of U.S. Provisional Patent Application No. 62/517,815 by AKKARAKARAN, et al., entitled "POWER CONTROL IN NEW RADIO SYSTEMS," filed Jun. 9, 2017, assigned to the assignee hereof, and expressly incorporated herein.

BACKGROUND

The following relates generally to wireless communication and more specifically to power control in New Radio (NR) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a NR system).

A wireless multiple-access communications system may include a number of base stations or access network nodes, each simultaneously supporting communication for multiple communication devices, which may be otherwise known as user equipment (UE). In some cases, NR systems may support additional features (e.g., when compared to LTE systems) to improve the efficiency and flexibility of the system. For instance, NR systems may support ultra-reliable low latency communication (URLLC) between a UE and a base station to reduce the latency of high priority communications. However, conventional techniques for power control may not be suitable for wireless devices communicating using the additional features supported by NR systems.

SUMMARY

The described techniques relate to improved methods, systems, devices, or apparatuses that support power control in New Radio (NR) systems. In one example, a user equipment (UE) may determine a transmit power for a control channel based on an effective code rate of control information to be transmitted in the control channel. In another example, the UE may be configured to use a different transmit power for repeated transmissions of control information in a control channel. In yet another example, the UE may be configured to determine a transmit power for a transmission in a time interval or scale the power of a transmission in a time interval based on a priority of the transmission relative to other transmissions scheduled in the time interval. In yet another example, the UE may be configured to determine respective transmit powers for uplink transmissions multiplexed differently using different open-loop parameters.

A method of wireless communication is described. The method may include determining a number of resource blocks allocated for control information to be transmitted in a control channel of a transmission time interval (TTI), a payload size of the control information, and a number of resource elements of the resource blocks used for transmission of the control information, determining a transmit power for the control channel during the TTI based at least in part on the number of resource blocks allocated for control information, the payload size of the control information, and the number of resource elements of the resource blocks used for transmission of the control information, and transmitting the control information during the TTI using the determined transmit power.

An apparatus for wireless communication is described. The apparatus may include means for determining a number of resource blocks allocated for control information to be transmitted in a control channel of a TTI, a payload size of the control information, and a number of resource elements of the resource blocks used for transmission of the control information, means for determining a transmit power for the control channel during the TTI based at least in part on the number of resource blocks allocated for control information, the payload size of the control information, and the number of resource elements of the resource blocks used for transmission of the control information, and means for transmitting the control information during the TTI using the determined transmit power.

Another apparatus for wireless communication is described. The apparatus may include a processor, memory in electronic communication with the processor, and instructions stored in the memory. The instructions may be operable to cause the processor to determine a number of resource blocks allocated for control information to be transmitted in a control channel of a TTI, a payload size of the control information, and a number of resource elements of the resource blocks used for transmission of the control information, determine a transmit power for the control channel during the TTI based at least in part on the number of resource blocks allocated for control information, the payload size of the control information, and the number of resource elements of the resource blocks used for transmission of the control information, and transmit the control information during the TTI using the determined transmit power.

A non-transitory computer readable medium for wireless communication is described. The non-transitory computer-readable medium may include instructions operable to cause a processor to determine a number of resource blocks allocated for control information to be transmitted in a control channel of a TTI, a payload size of the control information, and a number of resource elements of the resource blocks used for transmission of the control information, determine a transmit power for the control channel during the TTI based at least in part on the number of resource blocks allocated for control information, the payload size of the control information, and the number of resource elements of the resource blocks used for transmission of the control information, and transmit the control information during the TTI using the determined transmit power.

Some examples of the method, apparatus, and non-transitory computer-readable medium described above may further include processes, features, means, or instructions for determining an effective code rate for the control information based at least in part on the number of resource blocks allocated for control information, the payload size of the control information, and the number of resource elements of the resource blocks used for transmission of the control information, wherein the transmit power is determined based at least in part on the effective code rate. In some examples of the method, apparatus, and non-transitory computer-readable medium described above, determining the transmit power for the control channel during the TTI may be further based at least in part on a message format of the control channel.

A method of wireless communication is described. The method may include performing a first transmission of control information in a control channel during a first TTI using a first transmit power, identifying control information of the first transmission to be repeated during a second TTI, determining a second transmit power for repeating transmission of the control information during the second TTI, where the first transmit power is different from the second transmit power, and repeating the transmission of the control information in the control channel during the second TTI using the determined second transmit power.

An apparatus for wireless communication is described. The apparatus may include means for performing a first transmission of control information in a control channel during a first TTI using a first transmit power, means for identifying control information of the first transmission to be repeated during a second TTI, means for determining a second transmit power for repeating transmission of the control information during the second TTI, where the first transmit power is different from the second transmit power, and means for repeating the transmission of the control information in the control channel during the second TTI using the determined second transmit power.

Another apparatus for wireless communication is described. The apparatus may include a processor, memory in electronic communication with the processor, and instructions stored in the memory. The instructions may be operable to cause the processor to perform a first transmission of control information in a control channel during a first TTI using a first transmit power, identify control information of the first transmission to be repeated during a second TTI, determine a second transmit power for repeating transmission of the control information during the second TTI, where the first transmit power is different from the second transmit power, and repeat the transmission of the control information in the control channel during the second TTI using the determined second transmit power.

A non-transitory computer readable medium for wireless communication is described. The non-transitory computer-readable medium may include instructions operable to cause a processor to perform a first transmission of control information in a control channel during a first TTI using a first transmit power, identify control information of the first transmission to be repeated during a second TTI, determine a second transmit power for repeating transmission of the control information during the second TTI, where the first transmit power is different from the second transmit power, and repeat the transmission of the control information in the control channel during the second TTI using the determined second transmit power.

In some examples of the method, apparatus, and non-transitory computer-readable medium described above, the first transmission of the control information may be in a first beam direction, and where repeating the transmission of the control information includes repeating the transmission of the control information in a second beam direction that may be different from the first beam direction.

Some examples of the method, apparatus, and non-transitory computer-readable medium described above may further include processes, features, means, or instructions for identifying a first path loss associated with the first transmission of the control information, where the first transmit power may be determined based at least in part on the first path loss. Some examples of the method, apparatus, and non-transitory computer-readable medium described above may further include processes, features, means, or instructions for identifying a second path loss associated with the repeated transmission of the control information, where the second transmit power may be determined based at least in part on the second path loss.

Some examples of the method, apparatus, and non-transitory computer-readable medium described above may further include processes, features, means, or instructions for receiving downlink control information (DCI) that includes a transmit power control (TPC) command relating to the second transmit power for repeating the transmission of the control information, where the second transmit power may be determined based at least in part on the TPC command.

In some examples of the method, apparatus, and non-transitory computer-readable medium described above, the DCI further indicates whether the TPC command may be applicable to the repeated transmission of the control information. In some examples of the method, apparatus, and non-transitory computer-readable medium described above, the DCI further indicates a repeated transmission to which the TPC command applies. In some examples of the method, apparatus, and non-transitory computer-readable medium described above, the DCI may be applicable to repeated transmissions of control information scheduled after a fixed delay from a time interval in which the DCI may be received.

In some examples of the method, apparatus, and non-transitory computer-readable medium described above, a first set of one or more step-sizes in the TPC command relating to the second transmit power for repeating the transmission of the control information may be different from a second set of one or more step-sizes in another TPC command relating to the first transmit power. Some examples of the method, apparatus, and non-transitory computer-readable medium described above may further include processes, features, means, or instructions for identifying a table in the TPC command that indicates a relationship between step-sizes and repetition indices for repeated transmissions of control information, where the second transmit power may be determined based at least in part on the table and a repetition index of the repeated transmission.

A method of wireless communication is described. The method may include identifying data to be transmitted in a data channel during a TTI, determining a first transmit power for the data channel during the TTI based at least in part on a frequency division multiplexing of a portion of the data channel with a control channel during the TTI, and transmitting the data in the data channel during the first TTI using the determined first transmit power.

An apparatus for wireless communication is described. The apparatus may include means for identifying data to be transmitted in a data channel during a TTI, means for determining a first transmit power for the data channel during the TTI based at least in part on a frequency division multiplexing of a portion of the data channel with a control channel during the TTI, and means for transmitting the data in the data channel during the first TTI using the determined first transmit power.

Another apparatus for wireless communication is described. The apparatus may include a processor, memory in electronic communication with the processor, and instructions stored in the memory. The instructions may be operable to cause the processor to identify data to be transmitted in a data channel during a TTI, determine a first transmit power for the data channel during the TTI based at least in part on a frequency division multiplexing of a portion of the data channel with a control channel during the TTI, and transmit the data in the data channel during the first TTI using the determined first transmit power.

A non-transitory computer readable medium for wireless communication is described. The non-transitory computer-readable medium may include instructions operable to cause a processor to identify data to be transmitted in a data channel during a TTI, determine a first transmit power for the data channel during the TTI based at least in part on a frequency division multiplexing of a portion of the data channel with a control channel during the TTI, and transmit the data in the data channel during the first TTI using the determined first transmit power.

Some examples of the method, apparatus, and non-transitory computer-readable medium described above may further include processes, features, means, or instructions for determining the first transmit power for the data channel of the TTI independent of a second transmit power for the control channel during the TTI. Some examples of the method, apparatus, and non-transitory computer-readable medium described above may further include processes, features, means, or instructions for determining a second transmit power for the portion of the data channel during the TTI based at least in part on a third transmit power for the control channel during the TTI.

Some examples of the method, apparatus, and non-transitory computer-readable medium described above may further include processes, features, means, or instructions for determining a fourth transmit power for a remaining portion of the data channel during the first TTI that may be not frequency division multiplexed with the control channel, where the fourth transmit power may be greater than the second transmit power for the portion of the data channel frequency division multiplexed with the control channel.

A method of wireless communication is described. The method may include identifying data or control information to be transmitted in a first channel during a TTI, the first channel associated with a first transmission priority, determining that the first channel is frequency division multiplexed with a second channel associated with a second transmission priority that is higher than the first transmission priority in a portion of the TTI, determining a first transmit power for the second channel during the TTI independent of a second transmit power for the first channel during the TTI, and transmitting the second channel during the TTI using the determined first transmit power.

An apparatus for wireless communication is described. The apparatus may include means for identifying data or control information to be transmitted in a first channel during a TTI, the first channel associated with a first transmission priority, means for determining that the first channel is frequency division multiplexed with a second channel associated with a second transmission priority that is higher than the first transmission priority in a portion of the TTI, means for determining a first transmit power for the second channel during the TTI independent of a second transmit power for the first channel during the TTI, and means for transmitting the second channel during the TTI using the determined first transmit power.

Another apparatus for wireless communication is described. The apparatus may include a processor, memory in electronic communication with the processor, and instructions stored in the memory. The instructions may be operable to cause the processor to identify data or control information to be transmitted in a first channel during a TTI, the first channel associated with a first transmission priority, determine that the first channel is frequency division multiplexed with a second channel associated with a second transmission priority that is higher than the first transmission priority in a portion of the TTI, determine a first transmit power for the second channel during the TTI independent of a second transmit power for the first channel during the TTI, and transmit the second channel during the TTI using the determined first transmit power.

A non-transitory computer readable medium for wireless communication is described. The non-transitory computer-readable medium may include instructions operable to cause a processor to identify data or control information to be transmitted in a first channel during a TTI, the first channel associated with a first transmission priority, determine that the first channel is frequency division multiplexed with a second channel associated with a second transmission priority that is higher than the first transmission priority in a portion of the TTI, determine a first transmit power for the second channel during the TTI independent of a second transmit power for the first channel during the TTI, and transmit the second channel during the TTI using the determined first transmit power.

Some examples of the method, apparatus, and non-transitory computer-readable medium described above may further include processes, features, means, or instructions for determining the second transmit power for the first channel based at least in part on the first transmit power and a maximum carrier power limit. Some examples of the method, apparatus, and non-transitory computer-readable medium described above may further include processes, features, means, or instructions for determining the first transmission priority based at least in part on a type of the first channel and the second transmission priority based at least in part on a type of the second channel.

Some examples of the method, apparatus, and non-transitory computer-readable medium described above may further include processes, features, means, or instructions for determining the first transmission priority based at least in part on a payload of the first channel and the second transmission priority based at least in part on a payload of the second channel. In some examples of the method, apparatus, and non-transitory computer-readable medium described above, the first channel or second channel includes one of a channel used for ultra-reliable low latency communication (URLLC) of control or data, a channel used for enhanced mobile broadband (eMBB) communication, a physical uplink control channel (PUCCH), a physical uplink shared channel (PUSCH), or a channel used for sounding reference signal (SRS) transmissions.

A method of wireless communication is described. The method may include identifying a first transmit power to be used for a first transmission associated with a first priority group, identifying a second transmit power to be used for a second transmission associated with a second priority group, where the second transmission is frequency division multiplexed with the first transmission, determining that a total of the first transmit power and the second transmit power exceeds a threshold, and transmitting either the first transmission or the second transmission based at least in part on the determination and a comparison of a first priority of the first priority group to a second priority of the second priority group.

An apparatus for wireless communication is described. The apparatus may include means for identifying a first transmit power to be used for a first transmission associated with a first priority group, means for identifying a second transmit power to be used for a second transmission associated with a second priority group, where the second transmission is frequency division multiplexed with the first transmission, means for determining that a total of the first transmit power and the second transmit power exceeds a threshold, and means for transmitting either the first transmission or the second transmission based at least in part on the determination and a comparison of a first priority of the first priority group to a second priority of the second priority group.

Another apparatus for wireless communication is described. The apparatus may include a processor, memory in electronic communication with the processor, and instructions stored in the memory. The instructions may be operable to cause the processor to identify a first transmit power to be used for a first transmission associated with a first priority group, identify a second transmit power to be used for a second transmission associated with a second priority group, where the second transmission is frequency division multiplexed with the first transmission, determine that a total of the first transmit power and the second transmit power exceeds a threshold, and transmit either the first transmission or the second transmission based at least in part on the determination and a comparison of a first priority of the first priority group to a second priority of the second priority group.

A non-transitory computer readable medium for wireless communication is described. The non-transitory computer-readable medium may include instructions operable to cause a processor to identify a first transmit power to be used for a first transmission associated with a first priority group, identify a second transmit power to be used for a second transmission associated with a second priority group, where the second transmission is frequency division multiplexed with the first transmission, determine that a total of the first transmit power and the second transmit power exceeds a threshold, and transmit either the first transmission or the second transmission based at least in part on the determination and a comparison of a first priority of the first priority group to a second priority of the second priority group.

Some examples of the method, apparatus, and non-transitory computer-readable medium described above may further include processes, features, means, or instructions for determining that the first priority group may be associated with a higher priority than the second priority group. Some examples of the method, apparatus, and non-transitory computer-readable medium described above may further include processes, features, means, or instructions for transmitting the first transmission and refraining from transmitting the second transmission based at least in part on the determination.

In some examples of the method, apparatus, and non-transitory computer-readable medium described above, the second transmission includes a sounding reference signal (SRS) transmission. In some examples of the method, apparatus, and non-transitory computer-readable medium described above, each of the first transmission group and the second transmission group may be associated with one or more transmission types having equal priority.

In some examples of the method, apparatus, and non-transitory computer-readable medium described above, the second transmission may be frequency division multiplexed with the first transmission in at least one symbol period, and where determining that the total of the first transmit power and the second transmit power exceeds a threshold includes determining that the total of the first transmit power and the second transmit power in the at least one symbol period exceeds the threshold.

A method of wireless communication is described. The method may include identifying data or control information to transmit in a first TTI using a first waveform, determining a first transmit power for the data or control information based at least in part on a first set of one or more open-loop parameters associated with the first waveform, where the first set of one or more open-loop parameters is different from a second set of one or more open-loop parameters associated with a second waveform, and transmitting the data or the control information in the first TTI using the determined transmit power.

An apparatus for wireless communication is described. The apparatus may include means for identifying data or control information to transmit in a first TTI using a first waveform, means for determining a first transmit power for the data or control information based at least in part on a first set of one or more open-loop parameters associated with the first waveform, where the first set of one or more open-loop parameters is different from a second set of one or more open-loop parameters associated with a second waveform, and means for transmitting the data or the control information in the first TTI using the determined transmit power.

Another apparatus for wireless communication is described. The apparatus may include a processor, memory in electronic communication with the processor, and instructions stored in the memory. The instructions may be operable to cause the processor to identify data or control information to transmit in a first TTI using a first waveform, determine a first transmit power for the data or control information based at least in part on a first set of one or more open-loop parameters associated with the first waveform, where the first set of one or more open-loop parameters is different from a second set of one or more open-loop parameters associated with a second waveform, and transmit the data or the control information in the first TTI using the determined transmit power.

A non-transitory computer readable medium for wireless communication is described. The non-transitory computer-readable medium may include instructions operable to cause a processor to identify data or control information to transmit in a first TTI using a first waveform, determine a first transmit power for the data or control information based at least in part on a first set of one or more open-loop parameters associated with the first waveform, where the first set of one or more open-loop parameters is different from a second set of one or more open-loop parameters associated with a second waveform, and transmit the data or the control information in the first TTI using the determined transmit power.

Some examples of the method, apparatus, and non-transitory computer-readable medium described above may further include processes, features, means, or instructions for receiving DCI that schedules a transmission of data or control information using the second waveform in a second TTI. Some examples of the method, apparatus, and non-transitory computer-readable medium described above may further include processes, features, means, or instructions for determining a second transmit power for the transmission of data or control information in the second TTI based at least in part on a TPC command included in the DCI.

In some examples of the method, apparatus, and non-transitory computer-readable medium described above, the TPC command includes a first set of one or more closed-loop parameters associated with transitioning between the first waveform in the first TTI and the second waveform in the second TTI, and the first set of one or more closed-loop parameters may be different from a second set of one or more of closed-loop parameters associated with successive transmissions associated with a same waveform.

In some examples of the method, apparatus, and non-transitory computer-readable medium described above, each of the first and second sets of one or more open-loop parameters includes at least one of a maximum carrier power limit, a fractional path loss constant, a signal-to-interference-plus-noise ratio (SINR) target P0, a modulation and coding scheme (MCS) based offset for different waveforms, and an closed-loop step-size. In some examples of the method, apparatus, and non-transitory computer-readable medium described above, each of the first waveform and the second waveform includes an orthogonal frequency division multiplexing (OFDM) waveform or a discrete fourier transform (DFT)-spread OFDM waveform.

DETAILED DESCRIPTION

A wireless communication system may support wireless communication between a base station and a user equipment (UE). Some wireless communications systems (e.g., New Radio (NR) systems), however, may support different or additional features when compared to other wireless communications systems (e.g., Long Term Evolution (LTE) systems). For example, a UE in a New Radio (NR) system may support different techniques for multiplexing uplink signals transmitted to a base station (e.g., using orthogonal frequency division multiplexing (OFDM) or discrete Fourier transform (DFT) spread OFDM (DFT-S-OFDM)). In another example, an NR system may support ultra-reliable low latency communication (URLLC) between a UE and a base station. In yet another example, an NR system may support a wide range of payloads for uplink transmissions of control information to a base station (e.g., due to code block group (CBG)-based hybrid automatic repeat request (HARM) feedback).

Given these additional features introduced in NR systems, conventional techniques for determining a transmit power for uplink communication may be inefficient. As described herein, a wireless communications system may support efficient techniques for configuring a UE to determine an appropriate transmit power for an uplink transmission. In one example, a UE may determine a transmit power for a control channel based on an effective code rate of control information to be transmitted in the control channel. In another example, the UE may be configured to use a different transmit power for repeated transmissions of control information in a control channel. In yet another example, the UE may be configured to determine a transmit power for a transmission in a time interval or scale a transmission in a time interval based on a priority of the transmission relative to other transmissions scheduled in the time interval. In yet another example, the UE may be configured to determine respective transmit powers for uplink transmissions multiplexed differently using different open-loop parameters.

Aspects of the disclosure introduced above are described below in the context of a wireless communications system. Examples of processes and signaling exchanges that support power control in NR systems are then described. Aspects of the disclosure are further illustrated by and described with reference to apparatus diagrams, system diagrams, and flowcharts that relate to power control in NR systems.

Figure 1:
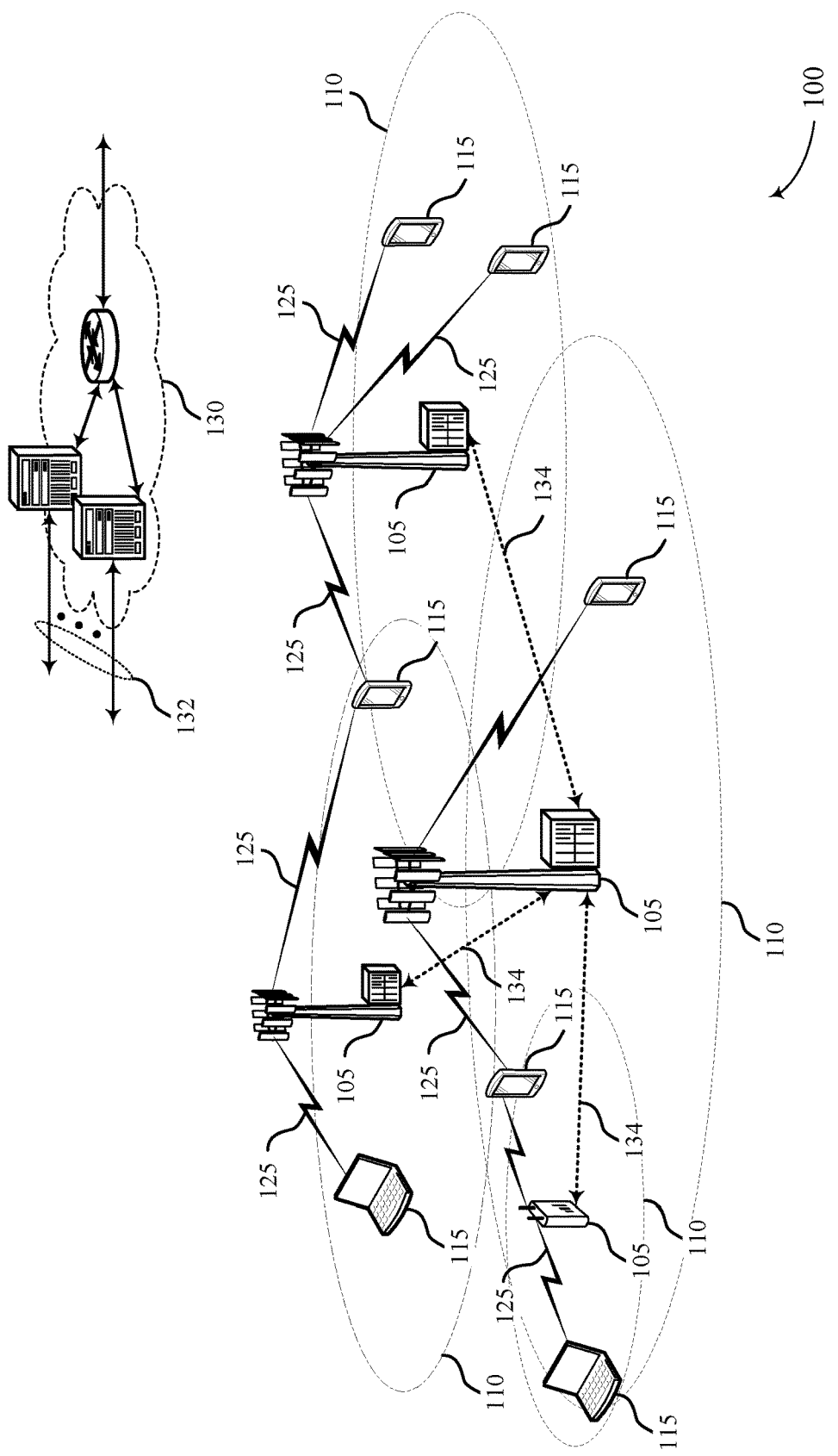
FIG. 1 illustrates an example of a wireless communications system that supports power control in accordance with various aspects of the present disclosure.

FIG. 1 illustrates an example of a wireless communications system 100 that supports power control in accordance with various aspects of the present disclosure. The wireless communications system 100 includes base stations 105, UEs 115, and a core network 130. In some examples, the wireless communications system 100 may be an LTE, LTE-Advanced (LTE-A) network, or an NR network. In some cases, wireless communications system 100 may support enhanced mobile broadband (eMBB) communications, ultra-reliable (i.e., mission critical) communications, low latency communications (e.g., ultra-reliable low latency communications (URLLC), and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Time intervals in LTE or NR may be expressed in multiples of a basic time unit (which may be a sampling period of $T_s=1/30,720,000$ seconds). Time resources may be organized according to radio frames of length of 10 ms ($T_f=307200$ Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods.

In wireless communications system 100, a TTI may be defined as the smallest unit of time in which a base station 105 may schedule a UE 115 for uplink or downlink transmissions. As an example, a base station 105 may allocate one or more TTIs for downlink communication with a UE 115. The UE 115 may then monitor the one or more TTIs to receive downlink signals from the base station 105. In some wireless communications systems (e.g., LTE), a subframe may be the basic unit of scheduling or TTI. In other cases, such as with low latency operation, a different, reduced-duration TTI (e.g., a short TTI) may be used (e.g., a mini-slot). Wireless communications system 100 may employ various TTI durations, including those that facilitate URLLC and eMBB communications, in addition to other types of communication associated with LTE and NR.

A resource element may consist of one symbol period and one subcarrier (e.g., a 15 KHz frequency range). In some cases, the numerology employed within a system (i.e., symbol size, subcarrier size, symbol-period duration, or TTI duration) may be selected or determined based on a type of communication. The numerology may be selected or determined in view of an inherent tradeoff between latency for low latency applications and efficiency for other applications, for example. In some cases, the duration of time slots allocated for eMBB communications may be greater than the duration of time slots allocated for URLLC. Time slots allocated for URLLC may be referred to as mini-slots.

In wireless communications system 100, a UE 115 may be configured by a base station 105 to transmit SRSs to the base station 105. The SRS transmissions may allow the base station 105 to estimate the channel quality of a channel so that the base station 105 may be able to allocate high quality resources for uplink communication with the UE 115. In some examples, the SRS transmission may span an entire system bandwidth to allow a base station to estimate the quality of resources across the system bandwidth. In other examples, however, the SRS transmission may be frequency division multiplexed (e.g., in wireless communications system 100) with transmissions of control information and data. In addition to SRS transmissions, other transmissions such as low latency transmissions may be frequency division multiplexed with transmissions of control information, data, and SRS in NR systems.

Thus, as introduced above, wireless communications system 100 may support different or additional features when compared to other wireless communications systems. Given these additional features supported in wireless communications system 100, conventional techniques for determining a transmit power for uplink communication may be inefficient. As described herein, wireless communications system 100 may support efficient techniques for configuring a UE 115 to determine an appropriate transmit power for an uplink transmission. In one example, a UE 115 may determine a transmit power for a control channel based on an effective code rate of control information to be transmitted in the control channel. In another example, the UE 115 may be configured to use a different transmit power for repeated transmissions of control information in a control channel. In yet another example, the UE 115 may be configured to determine a transmit power for a transmission in a time interval or scale a transmission in a time based on a priority of the transmission relative to other transmissions scheduled in the time interval. In yet another example, the UE 115 may be configured to determine respective transmit powers for uplink transmissions multiplexed differently using different open-loop parameters.

Figure 2:
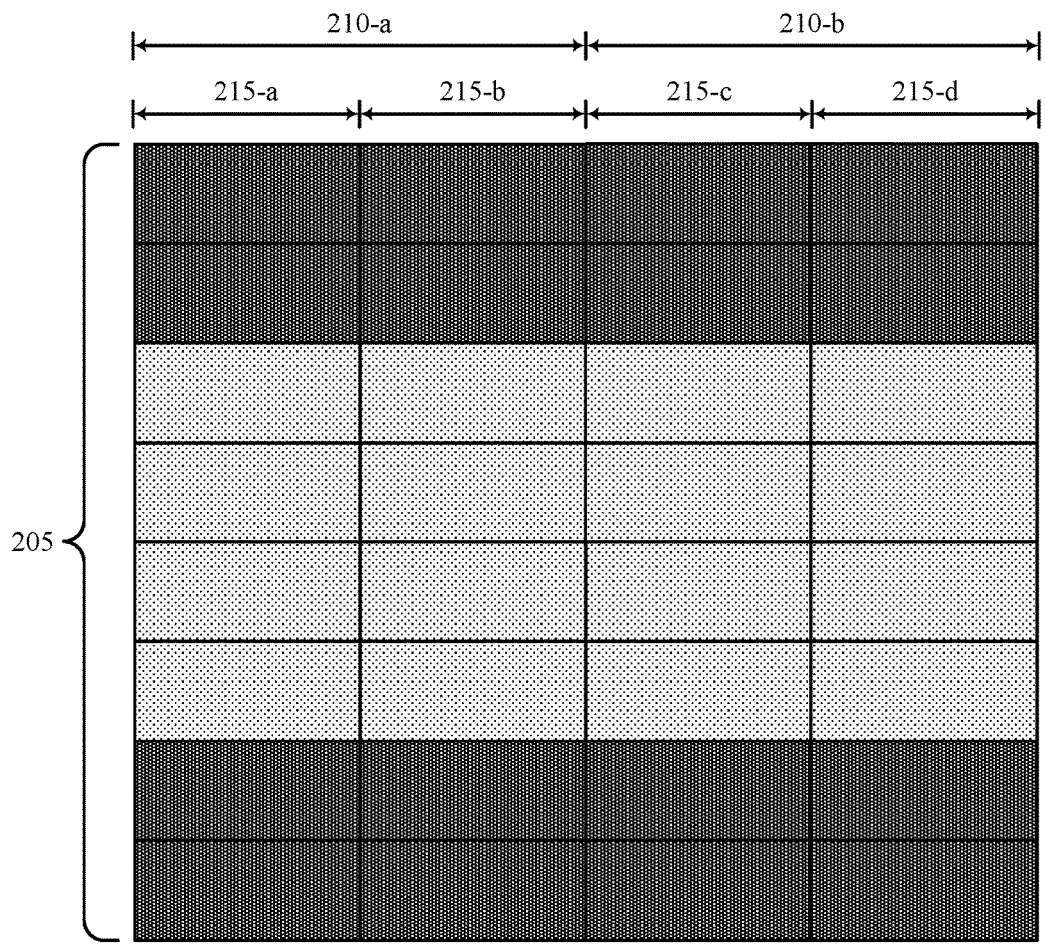
FIGS. 2-6 illustrate example of uplink control and data signaling in a system that power control in accordance with various aspects of the present disclosure.

FIG. 2 illustrates an example of uplink control and data signaling 200 in a system that supports power control in accordance with various aspects of the present disclosure. A base station 105 may allocate a set of resource blocks 205 for uplink communication with a UE 115. Specifically, the UE 115 may be scheduled to transmit uplink control information (e.g., PUCCH 220) and uplink data (e.g., PUSCH 225) during slots 215 of subframes 210. As illustrated, the resources allocated for PUCCH 220 may span a different portion of a system bandwidth than the resources allocated for PUSCH 225. That is, PUSCH transmissions may be frequency division multiplexed with PUCCH transmissions.

In some cases, the base station 105 may configure the UE 115 to transmit uplink control information in PUCCH 220 using a specific format (e.g., PUCCH format 1). Additionally, in some wireless communications systems (e.g., LTE systems), the base station 105 may configure a UE 115 to use a particular transmit power in a resource block for a PUCCH transmission based on the format of the PUCCH transmission. Specifically, the base station 105 may transmit a power offset (e.g., in a transmit power command (TPC)) to the UE 115 based on the format of the PUCCH transmission, and the UE 115 may use the power offset to adjust a transmit power for the PUCCH transmission. In one example, for PUCCH formats 4 and 5, the offset may be equal to $10*\log_{10} M$, where M corresponds to a number of resource blocks allocated for the PUCCH transmission.

In other wireless communications systems (e.g., NR systems), however, the number of resource blocks (or resource elements) used for the PUCCH transmission may vary. For example, the number of resource blocks (or resource elements) used for the PUCCH transmission may vary based on a number of resource blocks (or resource elements) in PUCCH 220 punctured for other transmissions. Further, the number of resource blocks (or resource elements) used for the PUCCH transmission may vary based on a payload size of the control information to be transmitted in PUCCH 220. Thus, it may be inefficient for a base station 105 to configure the UE 115 with a particular transmit power for a PUCCH transmission based only on a format of the PUCCH transmission. As described herein, a UE 115 in a wireless communications systems (e.g., wireless communications system 100) may support efficient techniques for determining a transmit power to use to transmit control information in PUCCH 220.

Specifically, a UE 115 may determine a transmit power for a PUCCH transmission based on a bandwidth or a number of resource blocks allocated for PUCCH 220, a payload size of the control information to be transmitted in PUCCH 220, an encoding scheme used to encode the control information to be transmitted in PUCCH 220 (e.g., Reed-Muller code or polar code), a number of resource blocks (or resource elements) used in PUCCH 220 (e.g., for low latency communications), or a combination thereof. In some examples, the UE 115 may derive an effective code rate of the control information to be transmitted in PUCCH 220 based on, for example, the bandwidth or the number of resource blocks allocated for PUCCH 220, the payload size of the control information to be transmitted in PUCCH 220, and the number of resource blocks (or resource elements) used in PUCCH 220.

As such, once the UE 115 has identified the effective code rate for the PUCCH transmission, the UE 115 may identify a transmit power for the PUCCH transmission based on the effective code rate. In other examples, the UE may identify a first offset to use to adjust the transmit power for the PUCCH transmission based on a format of the PUCCH transmission and a bandwidth available for the PUCCH transmission (e.g., number of resource blocks), and the UE 115 may identify a second offset to use to further adjust the transmit power for the PUCCH transmission based on the effective code rate as described above.

Figure 3:
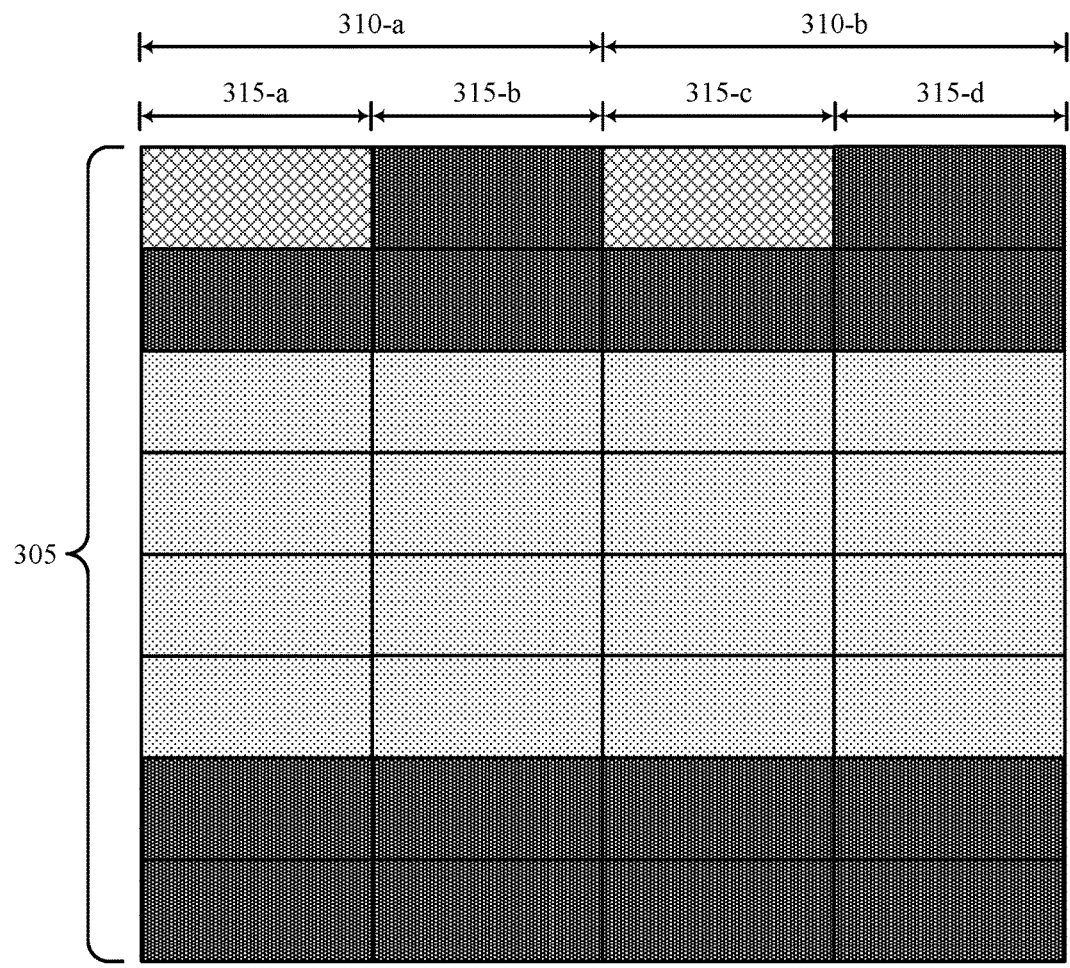

FIG. 3 illustrates an example of uplink control and data signaling 300 in a system that supports power control in accordance with various aspects of the present disclosure. A base station 105 may allocate a set of resource blocks 305 for uplink communication with a UE 115. Specifically, the UE 115 may be scheduled to transmit uplink control information (e.g., repeated PUCCH 320 and other PUCCH 325) and uplink data (e.g., PUSCH 330) during slots 315 of subframes 310. As illustrated, the resources allocated for PUCCH transmissions may span a different portion of a system bandwidth than the resources allocated for PUSCH transmissions. That is, the resources allocated for PUSCH transmissions may be frequency division multiplexed with the resources allocated for PUCCH transmissions.

In some cases, the base station 105 may configure the UE 115 to transmit uplink control information in a PUCCH 320 during a first slot 315-a of a subframe 310-a. The base station may also configure the UE 115 with a transmit power to use to transmit the control information in slot 315-a. In some cases, the base station may configure the UE 115 to transmit control information in slots 315-a and 315-b at the same transmission power. In some cases, the base station may configure the UE 115 to transmit control information in slots 315-a and 315-b at a different transmission power. In some wireless communications systems (e.g., NR systems), after transmitting the control information during the first slot 315-a, the UE 115 may determine to repeat the transmission of the control information in a subsequent slot 315-c. The techniques described herein allow a UE 115 to determine a transmit power for the repeated transmission of control information in a subsequent slot (e.g., for a repeated PUCCH 320).

In one example, the UE 115 may use the same transmit power to repeat the transmission of the control information in slot 315-c. Specifically, the UE 115 may determine the transmit power to use for the repeated transmission of the control information in slot 315-c based on the same parameters used to determine the transmit power used to transmit the control information in slot 315-a. In another example, the UE 115 may use a second transmit power to repeat the transmission of the control information in slot 315-c that is different from a first transmit power used to transmit the control information in slot 315-a. In some cases, the base station may configure the UE 115 to transmit control information in slots 315-c and 315-d at the same transmission power. In some cases, the base station may configure the UE 115 to transmit control information in slots 315-c and 315-d at a different transmission power. In some examples, the control information may be transmitted in slot 315-a in a first beam direction, and the control information may be repeated in a transmission in slot 315-c in a second beam direction.

In such examples and others, the UE 115 may determine the first transmit power based on a first path loss (e.g., associated with the first beam direction), and the UE 115 may determine the second transmit power based on a second path loss (e.g., associated with the second beam direction). Additionally, if any of the open-loop power control parameters such as the SINR target, fractional path loss factor alpha, or offset based on control format (e.g., PUCCH format) are reconfigured in the time interval between the first transmission and the repeated transmission, the updated parameters may be used for the repeated transmission. Further, the computation of the effective code-rate as described with reference to FIG. 2 may account for differences in amounts of puncturing experienced by the different repeated transmissions.

Additionally or alternatively, the UE 115 may receive an indication of the second transmit power in a TPC command included in DCI received from a base station 105. In some examples, the DCI used to configure the transmit power for a repeated transmission of control information may have a dedicated format (e.g., one of DCI formats 3, 3A, 6-0A, or 6-1A). Further, the transmit power configuration (e.g., transmit power offset) may include an indication that the information in the DCI is applicable to repeated transmissions of control information (or a particular repeated transmission of control information), and the DCI may apply to such repeated transmissions scheduled after a fixed delay from a time interval in which the DCI was received. For example, a TPC command included in a DCI received in a particular slot may apply to PUCCH transmissions in subsequent slots which may or may not include PUCCH transmissions triggered by the DCI. The techniques described with reference to FIG. 3 may also be used for repeated transmissions of uplink data (e.g., PUSCH repetitions).

Figure 4:
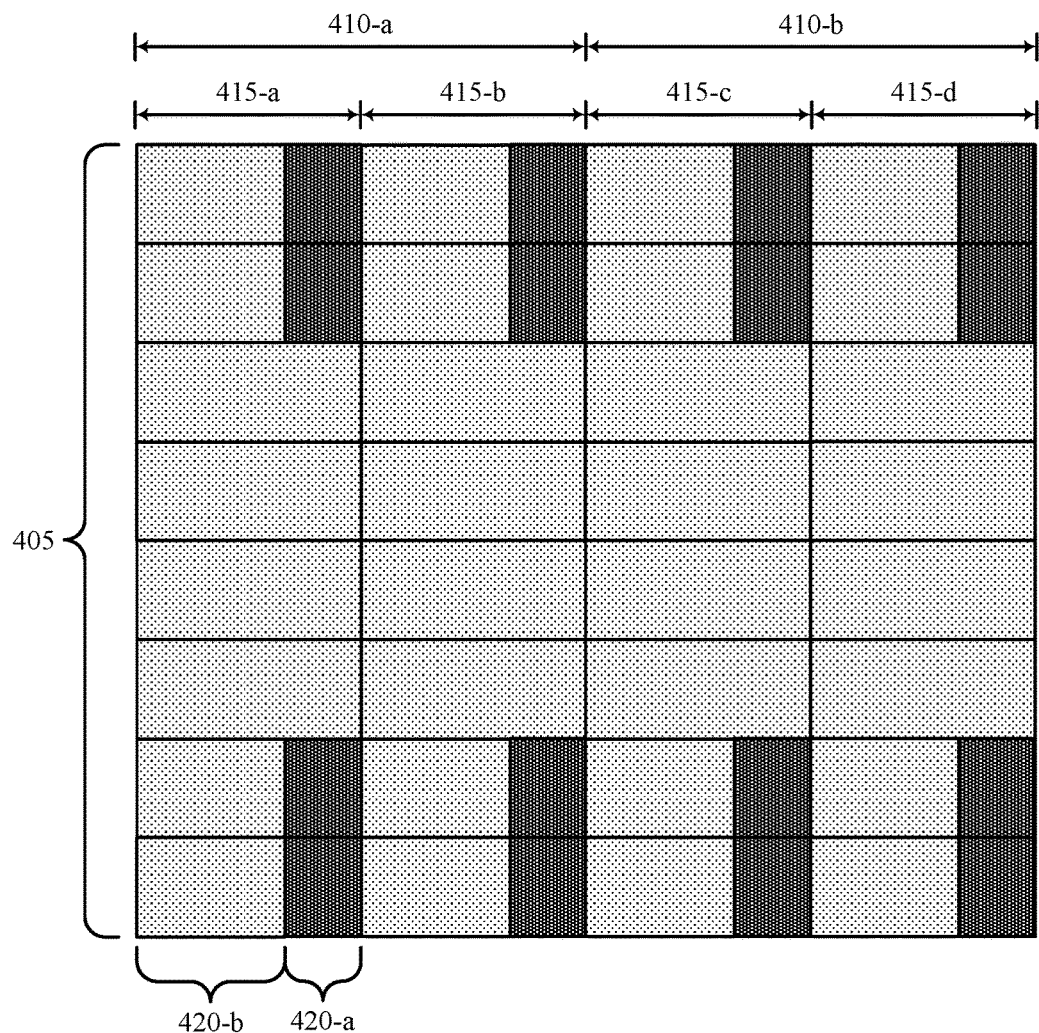

FIG. 4 illustrates an example of uplink control and data signaling 400 in a system that supports power control in accordance with various aspects of the present disclosure. A base station 105 may allocate a set of resource blocks 405 for uplink communication with a UE 115. Specifically, the UE 115 may be scheduled to transmit uplink control information (e.g., PUCCH 425), uplink data (e.g., PUSCH 430), and SRS during slots 415 of subframes 410. As illustrated, the resources allocated for PUCCH transmissions may span a different portion of a system bandwidth than the resources allocated for PUSCH transmissions. That is, the resources allocated for PUSCH transmissions may be frequency division multiplexed with the resources allocated for PUCCH transmissions.

In some cases, the base station 105 may configure the UE 115 to transmit uplink control information in PUCCH 425 and uplink data in PUSCH 430. In some wireless communications systems (e.g., LTE systems), the control channel and the data channel of a time interval may overlap for the entirety of the time interval. In such cases, a UE 115 may determine a transmit power for a PUCCH transmission based on a maximum carrier power limit, and the UE 115 may determine a transmit power for a PUSCH transmission based on the transmit power used for the PUCCH transmission and the maximum carrier power limit (e.g., $PCMax_c - P_{PUCCH}$).

In other wireless communications systems (e.g., NR systems), however, a base station may schedule a PUCCH transmission and a PUSCH transmission, where a fraction of the PUSCH transmission overlaps with the PUCCH transmission. That is, a fraction of the PUSCH transmission may be frequency division multiplexed with a PUCCH transmission (e.g., within slot 415-*a*). In such cases, it may be challenging for a UE 115 to determine appropriate transmit powers for the PUSCH transmission and the PUCCH transmission. As described herein, a UE 115 may support efficient techniques for determining transmit powers for a PUSCH transmission and a PUCCH transmission when a fraction (or portion) of the PUSCH transmission is frequency division multiplexed with a PUCCH transmission.

Specifically, the UE 115 may support efficient techniques for determining transmit powers for PUSCH and PUCCH transmissions during a first portion 420-*a* of a slot 415-*a* and a second portion 420-*b* of the slot 415-*a*. In one example, the UE 115 may determine the transmit power for the PUSCH transmission in the slot 415-*a* based on a maximum carrier power limit and independent of a transmit power to be used for the PUCCH transmission. In another example, the UE 115 may determine the transmit power for the PUSCH transmission in the first portion 420-*a* of slot 415-*a* based on the maximum carrier power limit and the transmit power to be used for the PUCCH transmission, and the UE 115 may determine the transmit power for the PUSCH transmission in the second portion 420-*b* of slot 415-*a* based on the maximum carrier power limit and independent of the transmit power to be used for the PUCCH transmission.

That is, the UE 115 may reserve power for the PUCCH transmission in the first portion 420-*a* of the slot 415-*a* and increase the power for the PUSCH transmission in the second portion 420-*b* of the slot 415-*a* (e.g., to compensate for the power reserved for the PUCCH transmission in the first portion 420-*a* of the slot 415-*a*). In some aspects, the power used for the PUSCH transmission in the second portion 420-*b* of the slot 415-*a* may be increased such that the total power used for the PUSCH transmission in slot 415-*a* remains at a nominal value that is similar to a transmit power that would be used if the PUSCH transmission was not frequency division multiplexed with the PUCCH transmission.

In another aspect, the UE 115 may determine the PUSCH transmit power based on the portion of the PUSCH that overlaps in time with PUCCH, and then use that same PUSCH transmit power for the entire PUSCH duration, or for the duration of that specific repetition of PUSCH in case when PUSCH repetition is employed. Further, although FIG. 4 illustrates an example of a PUCCH 425 in a first portion 420-*a* at the end of the slot 415-*a*, it is to be understood that the PUCCH 425 can span other portions of the slot 415-*a* (e.g., the PUCCH can be at the beginning of the slot 415-*a*).

Figure 5:
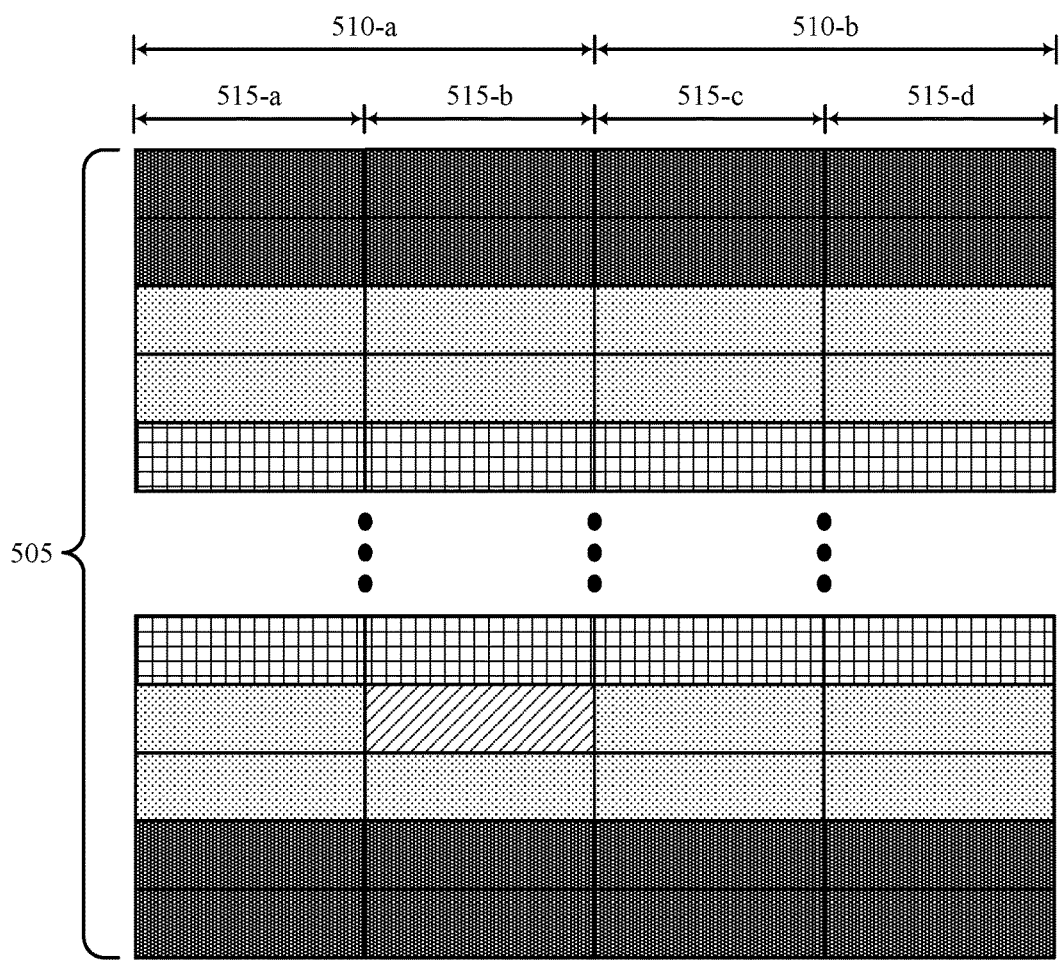

FIG. 5 illustrates an example of uplink control and data signaling 500 in a system that supports power control in accordance with various aspects of the present disclosure. A base station 105 may allocate a set of resource blocks 505 for uplink communication with a UE 115. Specifically, the UE 115 may be scheduled to transmit uplink control information (e.g., PUCCH 520), uplink data (e.g., PUSCH 525), and SRS 535 during slots 515 of subframes 510. As illustrated, the resources allocated for PUCCH transmissions may span a different portion of a system bandwidth than the resources allocated for PUSCH transmissions. That is, the resources allocated for PUSCH transmissions may be frequency division multiplexed with the resources allocated for PUCCH transmissions.

In some cases, the base station 105 may configure the UE 115 to transmit uplink control information in PUCCH 520 and uplink data in PUSCH 525. As described above, the transmission of the uplink control information in PUCCH 520 and the transmission of uplink data in PUSCH 525 may be frequency division multiplexed. Accordingly, in some wireless communications systems (e.g., LTE systems), the transmit power for the uplink transmission of control information may be determined based on a maximum carrier power limit, and the transmit power for the PUSCH transmission may be determined based on the transmit power used for the PUCCH transmission and the maximum carrier power limit.

In other wireless communications systems (e.g., NR systems), however, other transmissions may be frequency division multiplexed with PUSCH transmissions and PUCCH transmissions. For example, SRS transmissions 535 and punctured low latency transmissions (e.g., high priority transmission 530) may be frequency division multiplexed with PUSCH transmissions and PUCCH transmissions. Further, each of these different types of transmissions may be associated with different priorities. The techniques described herein allow a UE 115 to determine appropriate transmit powers for uplink transmissions that may be frequency division multiplexed with other uplink transmissions based on, for example, the priorities associated with the different transmissions.

In some cases, a set of resource blocks allocated for a PUSCH transmission may be punctured for a high priority transmission 530 (e.g., an ultra-reliable low latency transmission). A transmission may be considered a high priority transmission 530 if it takes precedence over or preempts (e.g., using puncturing) other transmissions scheduled for the same or overlapping resources. High-priority transmissions 530 may puncture lower-priority PUSCH transmissions and lower-priority PUCCH transmissions. In such cases, the UE 115 may prioritize the high priority transmission 530 and determine the transmit power for the high priority transmission 530 based on the maximum carrier power limit and independent of other transmit powers used for uplink transmissions frequency division multiplexed with the high priority transmission 530. For example, the high priority transmission 530 may be an uplink low latency data or control transmission in slot 515-*b*, and the UE 115 may determine the uplink transmit power for the low latency data or control transmission based on the maximum carrier power limit and independent of other transmit powers (e.g., transmit powers for PUCCH 520, PUSCH 525, and SRS transmissions 535 in slot 515-*b*).

Once the UE 115 determines the transmit power for the high priority transmission 530, the UE 115 may then determine the transmit power for the PUCCH transmissions in slot 515-*b* based on the maximum carrier power limit and the transmit power for the high priority transmission 530 (e.g., $PCMax_c-P_{URLLC}$) (e.g., since the PUCCH transmissions may be associated with a second highest priority in slot 515-*b*). The UE 115 may then determine the transmit power for the SRS transmissions based on the maximum carrier power limit and the transmit powers for the high priority transmission 530 and the PUCCH transmissions 520 (e.g., $PCMax_c-P_{PUCCH}-P_{URLLC}$), and the transmit power for the PUSCH transmission based on the maximum carrier power limit and the transmit powers for the high priority transmission 530, PUCCH transmissions 520, and the SRS transmissions 535 (e.g., $PCMax_c-P_{SRS}-P_{PUCCH}-P_{URLLC}$).

Thus, using the techniques described herein, a UE 115 may determine transmit power for multiple transmissions that are frequency division multiplexed in a time interval (e.g., slot 515-*b* or a symbol of one of slots 515) based on the priorities associated with the multiple transmissions. Although the examples described above may not include an exhaustive list of the different types of transmissions that may be frequency division multiplexed within a time interval, it is to be understood that the UE 115 may apply the same techniques to determine the transmit power for such different types of transmissions based on priorities associated with the different types of transmissions.

As an example, a low latency uplink transmission of control information may be associated with a higher priority than a low latency uplink transmission of data. Thus, using the techniques described herein, the transmit power for the transmission of the low latency control information may be determined based on transmit powers of higher priority transmissions and independent of transmit powers of lower priority transmissions such as the low latency data transmission. Similarly, certain types of traffic may be associated with a higher priority than other types of traffic, and the transmit power used to transmit a type of traffic may be determined based on the priority of that type of traffic (e.g., URLLC traffic, eMBB, and the like). Further, certain payloads may be associated with a higher priority than other payloads, and the transmit power used to transmit certain payloads may be determined based on the priority of the payload. For example, an eMBB PUCCH that includes an ACK may be associated with a higher priority than a low latency data packet.

Figure 6:
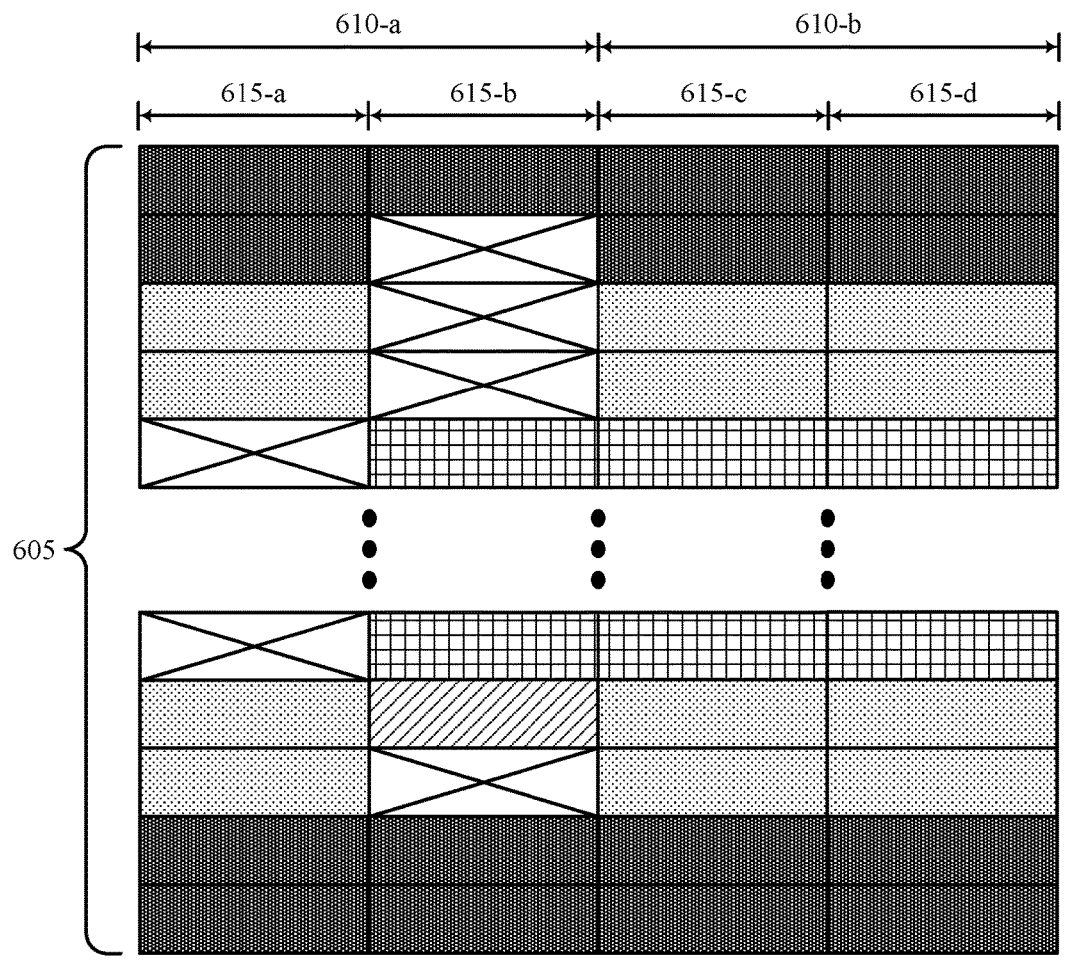

FIG. 6 illustrates an example of uplink control and data signaling 600 in a system that supports power control in accordance with various aspects of the present disclosure. A base station 105 may allocate a set of resource blocks 605 for uplink communication with a UE 115. Specifically, the UE 115 may be scheduled to transmit uplink control information (e.g., PUCCH 620), uplink data (e.g., PUSCH 625), and SRS 635 during slots 615 of subframes 610. As illustrated, the resources allocated for PUCCH transmissions may span a different portion of a system bandwidth than the resources allocated for PUSCH transmissions. That is, the resources allocated for PUSCH transmissions may be frequency division multiplexed with the resources allocated for PUCCH transmissions.

In some cases, the base station 105 may configure the UE 115 to transmit uplink control information in PUCCH 620 and uplink data in PUSCH 625. As described above, the uplink transmission of the control information in PUCCH 620 and the uplink transmission of data in PUSCH may be frequency division multiplexed. Accordingly, in some wireless communications systems (e.g., LTE systems), the transmit power for an uplink transmission in a time interval (e.g., slot 615) may be scaled to be equal to or less than a maximum carrier power limit. That is, the UE 115 may be configured to refrain from transmitting a portion of the signals in a time interval such that the total transmit power of the uplink transmissions in the time interval is equal to or less than a maximum carrier power limit.

In other wireless communications systems (e.g., NR systems), however, other transmissions may be frequency division multiplexed with PUSCH transmissions and PUCCH transmissions. For example, SRS transmissions and punctured low latency transmissions may be frequency division multiplexed with PUSCH transmissions and PUCCH transmissions. Further, each of these different types of transmissions may be associated with different priorities. The techniques described herein allow a UE 115 to appropriately scale uplink transmissions frequency division multiplexed within a time interval such that the total transmit power in the time interval is equal to or less than a maximum carrier power limit.

In one example, a UE 115 may refrain from transmitting signals of a certain type based on predefined rules such that the total transmit power in a time interval remains below the maximum. For instance, the UE 115 may determine that the total power in slot 615-*a* exceeds the maximum carrier power limit, and, in some examples, the UE 115 may be configured to refrain from transmitting SRSs in slot 615-*a*. Accordingly, the scaled transmission 640 in slot 615-*a* may reduce the total transmit power in slot 615-*a* such that the UE 115 may be able to transmit the other uplink signals with a total transmit power less than or equal to a maximum carrier power limit.

In another example, the UE 115 may sort the uplink transmissions in a slot 615 into priority groups (e.g., three or more groups), where each group includes one or more transmissions having equal priority. In the example of FIG. 6, the UE 115 may sort PUCCH transmissions 620 into a first priority group, PUSCH transmissions 625 into a second priority group, SRS transmissions 635 into a third priority group, and high priority transmission 630 into a fourth priority group. As illustrated, the second priority group including PUSCH transmissions may be associated with a lowest priority of the priority groups. Accordingly, if the UE 115 determines that the total power in slot 615-*b* exceeds the maximum carrier power limit, the UE 115 may be configured to scale the PUSCH transmissions 625 (i.e., scaled transmissions 640 in slot 615-*b*).

After scaling the PUSCH transmissions, the UE 115 may determine that the total transmit power in slot 615-*b* is still greater than the maximum carrier power limit. Accordingly, UE 115 may determine that PUCCH transmissions in slot 615-*b* are associated with the second lowest priority of the priority groups, and UE 115 may scale a PUCCH transmission 620 in slot 615-*b*. In some examples (as shown), the UE may be configured to scale a portion of the PUCCH transmissions 620 in slot 615-*b*. However, in other examples (not shown), the UE 115 may be configured to scale all PUCCH transmissions 620 in slot 615-*b*. That is, the UE 115 may scale all transmissions in the priority group associated with the second lowest priority if the transmit power within the time interval remains above the maximum carrier power limit after scaling all transmissions in the priority group associated with the lowest priority.

In yet another example, the UE 115 may sort the uplink transmissions in a slot 615 into priority groups, where each group includes one or more transmissions having equal priority. And the UE 115 may analyze each group to determine whether to scale transmissions within the group. For instance, the UE 115 may start with a highest priority group, and the UE may determine if the transmit power to be used to transmit the signals in the highest priority group falls below the maximum carrier power limit (i.e., if there is sufficient power to transmit the signals in the highest priority group). If the UE determines that there is sufficient transmit power to transmit the signals in the highest priority group, the UE may reserve power to transmit the signals in the highest priority group.

The UE 115 may then determine if there is sufficient transmit power to transmit the signals in a second highest priority group (e.g., after reserving power to transmit signals in the highest priority group). The UE 115 may continue this process of determining whether there is sufficient power to transmit signals in each priority group until there is not enough power available to transmit signals in a specific priority group. In such cases, the UE 115 may refrain from transmitting signals in the specific priority group and priority groups having lower priorities. Alternatively, the UE 115 may transmit the signals associated with the specific priority group with power levels scaled such that there is sufficient power to transmit the signals within the specific priority group, and the UE 115 may refrain from transmitting signals in priority groups having lower priorities. Using these techniques, the UE 115 may be guaranteed to have sufficient power to transmit the signals in the highest priority group based on power formulas applied prior to power scaling.

Although the techniques described above relate to performing power scaling in a slot 615, it is to be understood that the UE 115 may be able to scale uplink transmission that are frequency division multiplexed in a symbol such that the total transmit power within a symbol is less than or equal to a maximum carrier power limit. Additionally, although the techniques described above relate to scaling transmissions that overlap within an entire TTI, the techniques described above may also apply to scaling transmissions that overlap within a portion of a TTI. In such cases, if a UE 115 determines to scale an uplink transmission that overlaps partially with another uplink transmission in a TTI, the UE 115 may scale the entire uplink transmission rather than the portion of the uplink transmission that overlaps with the other uplink transmission in the TTI. Additionally, the UE 115 may determine which transmissions to scale based on determining if one or more transmissions are repeated.

In addition or as an alternative to the techniques described above, a UE 115 described herein may be configured to determine an appropriate transmit power for uplink transmissions associated with a variety of waveforms (e.g., DFT-S-OFDM waveforms and OFDM waveforms). Specifically, the techniques described herein allow the UE 115 to determine a transmit power for an uplink transmission of control information or data based on different parameters depending on a waveform used for the transmission. In one example, a base station 105 may use independent closed-loop parameters (or TPC commands) for configuring a UE 115 with an appropriate transmit power for an uplink transmission depending on whether the uplink transmission is to be multiplexed using a DFT-S-OFDM waveform or an OFDM waveform.

In another example, the base station 105 may use common closed-loop parameters (or TPC commands) for configuring a UE 115 with an appropriate transmit power for an uplink transmission, and the base station 105 may use different open-loop parameters for configuring the UE 115 with appropriate transmit powers for uplink transmissions multiplexed using different waveforms. For example, the base station may identify different P0 (SINR target) values, different fractional path-loss constants, and different MCS-based or code-rate-based offsets to configure the UE 115 with an appropriate transmit power for the uplink transmission depending on whether the uplink transmission uses DFT-S-OFDM or OFDM.

In one example, the base station 105 may provide a first transmit power offset parameter for uplink transmissions using DFT-S-OFDM, and the base station 105 may provide a second transmit power offset parameter (e.g., a relative transmit power offset parameter to be used in combination with the first transmit power offset parameter) for uplink transmissions using OFDM, or vice versa. In some aspects, the relative transmit power offset parameter may depend on a modulation order or a coding rate of the uplink transmission. For example, the base station 105 may not provide a relative transmit power offset for uplink transmissions associated with low modulation orders (e.g., quadrature phase shift keying (QPSK)) or coding rates, and the base station 105 may provide a relative transmit power offset for uplink transmissions associated with high modulation orders (e.g., 16-quadrature amplitude modulation (QAM) or 64-QAM) or high coding rates.

In addition to the techniques described above, a base station 105 may also configure a UE 115 with an appropriate transmission power for an uplink transmission using DFT-S-OFDM following a previous uplink transmission using OFDM, or vice versa. Specifically, the base station 105 may provide different (e.g., larger) step sizes (or offsets) in a TPC command when a UE 115 is configured to switch between multiplexing techniques (i.e., DFT-S-OFDM and OFDM) for an uplink transmission. These step sizes may be larger than the step sizes (or offsets) included in a TPC command for successive uplink transmissions multiplexed identically (i.e., using either DFT-S-OFDM or OFDM).

Accordingly, using these techniques, the UE 115 may be able to identify a steady state power-level faster for an OFDM transmission following a DFT-S-OFDM transmission, or vice versa. The techniques described above may relate to determining a transmit power for a PUSCH transmission or a PUCCH transmission. In some examples, for PUSCH transmissions, the UE 115 may switch between DFT-S-OFDM and OFDM in a first transmission or during HARQ retransmissions. That is, in some examples, the different step sizes to be used when the waveform is changed may be applied for all waveform changes. Alternatively, in other examples, the different step sizes may be applied only when the waveform changes at specific HARQ transmission indices (e.g., only at the first transmission).

Figure 7:
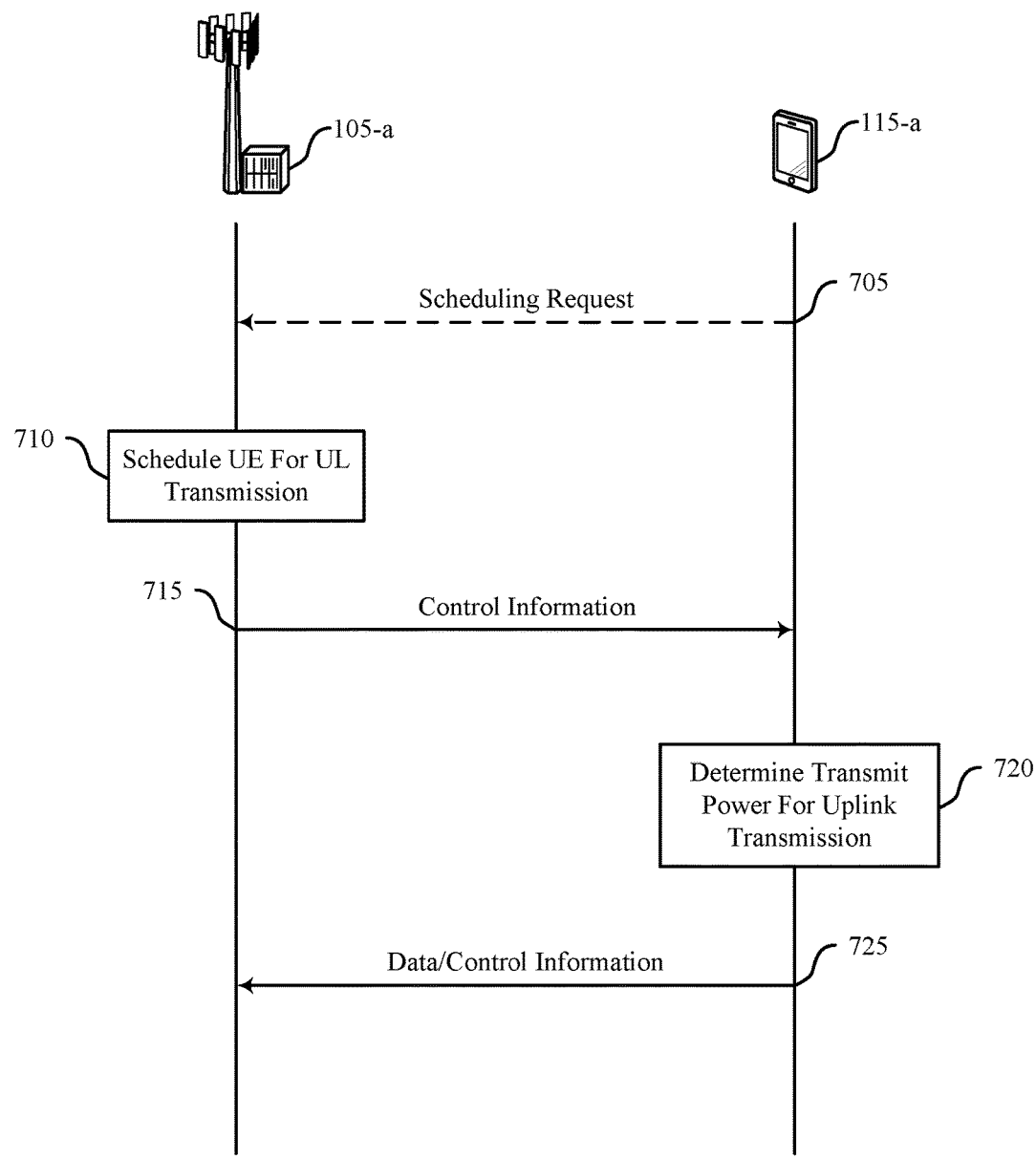
FIGS. 7-9 illustrate examples of process flows for power control in New Radio (NR) systems in accordance with various aspects of the present disclosure.

FIG. 7 illustrates an example of a process flow 700 for power control in NR systems in accordance with various aspects of the present disclosure. Process flow 700 illustrates aspects of techniques performed by a base station 105-a, which may be an example of a base station 105 described with reference to FIG. 1. Process flow 700 also illustrates aspects of techniques performed by a UE 115-a, which may be an example of a UE 115 described with reference to FIG. 1.

At 705, UE 115-a may identify data or control information to transmit to base station 105-a, and the UE 115-a may transmit a scheduling request to base station 105-a requesting resources for an uplink transmission. In other cases, UE 115-a may not transmit the scheduling request (e.g., if UE 115-*a* is scheduled on a persistent or semi-persistent basis). At 710, base station 105-*a* may schedule UE 115-*a* for an uplink transmission. For example, base station 105-*a* may identify resources for the uplink transmission, and base station 105-*a* may allocate these resource to UE 115-*a* for the uplink transmission.

At 715, base station 105-*a* may transmit control information (e.g., DCI) to UE 115-*a*. The control information may include an uplink grant, a TPC command, MCS index values, effective code rate index values, priority information (e.g., channel or transmission-type priority information), and the like. An uplink grant may indicate which uplink resources are scheduled for an uplink transmission by UE 115-*a*. A TPC command may include an offset indicating a change in transmit power relative to a current or default transmit power for UE 115-*a*. In some cases, the TPC command may specify a transmit power for subsequent transmissions by UE 115-*a*. Effective code rate index values may include a list of indices that correspond to different effective code rates. In some cases, the DCI may be transmitted according to a dedicated format.

At 720, UE 115-*a* may determine a transmit power for the uplink transmission to base station 105-*a* based on the DCI and other factors. For instance, UE 115-*a* may determine the transmit power based on a number of factors including the TPC command, an effective code rate, a format of the PUCCH, the number of resource blocks available for an uplink transmission of control information in the PUCCH, the multiplexing of a control and data channel, transmission types, path loss estimates, priority information, and the like.

In some cases, UE 115-*a* may determine the transmit power for a control channel during a TTI based on a number of resource blocks allocated for control information, the payload size of the control information, and the number of resource elements of the resource blocks used for transmission of the control information. In some examples, UE 115-*a* may determine an effective code rate for the control information based on the number of resource blocks allocated for control information, the payload size of the control information, and the number of resource elements of the resource blocks used for transmission of the control information, where the transmit power is determined based on the effective code rate.

For example, UE 115-*a* may match the effective code rate with an effective code rate index value received from base station 105-*a*, and may modify the transmit power based on the value of the effective code rate. In some cases, UE 115-*a* may determine the transmit power for the control channel during the TTI based on both the effective code rate and a message format of the control channel, where base station 105-*a* may indicate to UE 115-*a* the message format or criteria for selecting the message format for the control channel. And at 725, UE 115-*a* may transmit the control information to base station 105-*a* during the TTI using the determined transmit power.

In some cases, UE 115-*a* may determine a transmit power for the data channel of an uplink transmission during a TTI based on a frequency division multiplexing of a portion of the data channel with a control channel during the TTI. In some cases, UE 115-*a* may determine the transmit power for the data channel of the TTI independent of a transmit power for the control channel during the TTI. In other cases, UE 115-*a* may determine a second transmit power for the portion of the data channel during the TTI based on the transmit power for the control channel during the TTI. In some examples, UE 115-*a* may determine a third transmit power for a remaining portion of the data channel during the first TTI that is not frequency division multiplexed with the control channel, the third transmit power being greater than the second transmit power for the portion of the data channel frequency division multiplexed with the control channel.

In some examples, base station 105-*a* may send an indication in the DCI directing UE 115-*a* to determine the transmit power for the data channel independent of the second transmit power for the data channel. While in other cases, base station 105-*a* may send an indication in the DCI directing UE 115-*a* to determine the transmit power for the data channel based on the transmit power of the control channel and/or to determine transmit power differently for a portion of the data channel that is multiplexed with the control channel than a portion of the data channel that is not multiplexed with the control channel. And at 725, UE 115-*a* may transmit the control information to base station 105-*a* during the TTI using the determined transmit power.

In some cases, UE 115-*a* may identify data or control information to be transmitted in a first channel during a TTI, where the first channel is associated with a first transmission priority. UE 115-*a* may also determine that the first channel is frequency division multiplexed with a second channel associated with a second transmission priority that is higher than the first transmission priority in a portion of the TTI. In some cases, UE 115-*a* may determine a first transmit power for the second channel independent of a second transmit power for the first channel during the TTI. And at 725, UE 115-*a* may transmit the control information to base station 105-*a* during the TTI using the determined transmit power.

In some cases, UE 115-*a* may determine the second transmit power for the first channel based on the first transmit power of the second channel and/or a maximum carrier power limit. In some cases, UE 115-*a* may determine the first transmission priority based on a type of the first channel and the second transmission priority based on a type of the second channel. In some examples, each of the first or second channel is used for any one of: URLLC of control information or data, eMBB communication, PUCCH transmissions, PUSCH transmissions, or SRS transmissions. In some cases, base station 105-*a* may indicate to the UE 115-*a* which of the first and second channels has a higher transmission priority.

Alternatively, base station 105-*a* may indicate to the UE 115-*a* that certain communication types (e.g., URLLC, eMBB communications, SRS transmissions) or channel types (e.g., PUSCH, PUCCH) have priority over other communication types or channel types. In some cases, UE 115-*a* may determine the first transmission priority based on a payload of the first channel and the second transmission priority based on a payload of the second channel. And at 720, UE 115-*a* may transmit the control information to base station 105-*a* during the TTI using the determined transmit power.

In some cases, UE 115-*a* may identify a first transmit power to be used for a first transmission associated with a first priority group and a second transmit power to be used for a second transmission associated with a second priority group, where the second transmission is frequency division multiplexed with the first transmission. For instance, the second transmission may be frequency division multiplexed with the first transmission in at least one symbol period. In some cases, the second transmission is an SRS transmission. In some cases, base station 105-*a* indicates to UE 115-*a* that certain transmission types (e.g., SRS transmissions) are associated with a lower priority than other transmissions. In some cases, both the first transmission group and the second transmission group may be associated with one or more transmission types having equal priority.

In some cases, UE 115-a may determine that a total of the first transmit power and the second transmit power exceeds a threshold. In some examples, UE 115-a may determine that the total of the first transmit power and the second transmit power exceeds a threshold in the at least one symbol period. In some cases, base station 105-a may indicate to UE 115-a a threshold for the transmit power of UE 115-a. And at 725, UE 115-a may transmit either the first transmission or the second transmission based on the determination that the total of the first and second transmit powers exceeds a threshold and a comparison of a first priority of the first priority group to a second priority of the second priority group. For instance, UE 115-a may transmit the first priority group after determining that the first priority group has a higher priority than the second priority group.

UE 115-a may determine a transmit power for a control or data transmission using any of the above techniques—alone or in combination. For instance, UE 115-a may use a combination of effective code rate information, identification of a control format, identification of frequency domain multiplexing of control and data channels, an offset in a TPC command, and path loss estimates in determining a transmit power for an uplink transmission. In some cases, base station 105-a indicates to UE 115-a which parameters and/or criteria UE 115-a should use when determining an uplink transmit power. In other cases, base station 105-a specifies to UE 115-a a transmit power to use for an uplink transmission.

Figure 8:
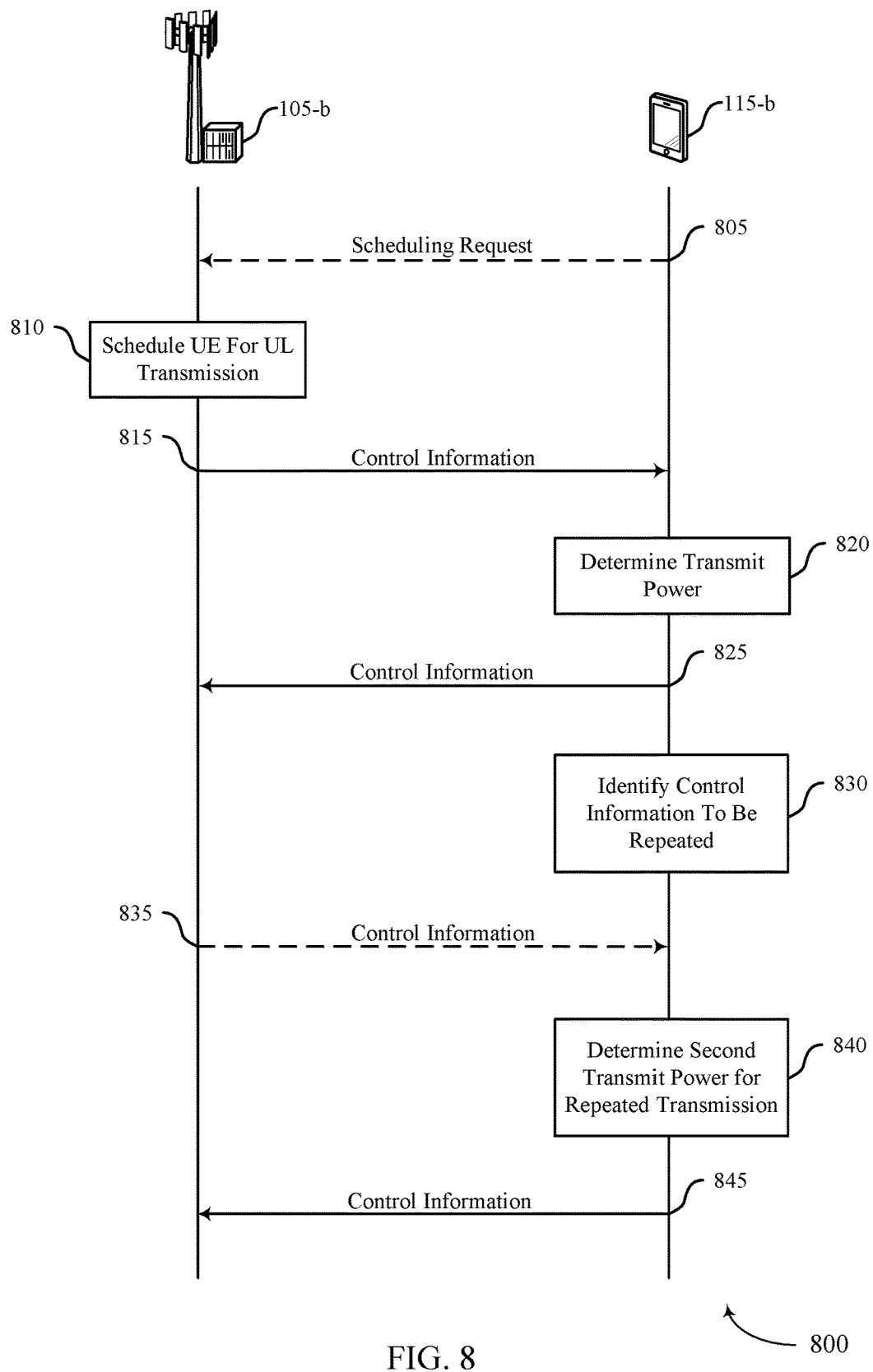

FIG. 8 illustrates an example of a process flow 800 for power control in NR systems in accordance with various aspects of the present disclosure. Process flow 800 illustrates aspects of techniques performed by a base station 105-b, which may be an example of a base station 105 described with reference to FIG. 1. Process flow 800 also illustrates aspects of techniques performed by a UE 115-b, which may be an example of a UE 115 described with reference to FIG. 1.

At 805, UE 115-b may identify data or control information to transmit to base station 105-b, and the UE 115-b may transmit a scheduling request to base station 105-b requesting resources for an uplink transmission. In other cases, UE 115-b may not transmit the scheduling request (e.g., if UE 115-b is scheduled on a persistent or semi-persistent basis). At 810, base station 105-b may schedule UE 115-b for an uplink transmission. For example, base station 105-b may identify resources for the uplink transmission, and base station 105-b may allocate these resource to UE 115-b for the uplink transmission.

At 815, base station 105-b may transmit control information (e.g., DCI) to UE 115-b. The control information may include an uplink grant, a TPC command, MCS index values, effective code rate index values, priority information (e.g., channel or transmission-type priority information), and the like. An uplink grant may indicate which uplink resources are scheduled for an uplink transmission by UE 115-b. A TPC command may include an offset indicating a change in transmit power relative to a current or default transmit power for UE 115-b. In some cases, the TPC command may specify a transmit power for subsequent transmissions by UE 115-b. Effective code rate index values may include a list of indices that correspond to different effective code rates. In some cases, the DCI may be transmitted according to a dedicated format.

At 820, UE 115-b may determine a transmit power for the uplink transmission to base station 105-b based on the DCI and other factors. For instance, UE 115-b may determine the transmit power based on a number of factors including the TPC command, an effective code rate, a format of the PUCCH, the number of RBs in the PUCCH, the multiplexing of a control and data channel, transmission types, path loss estimates, priority information, and the like as discussed herein and previously with respect to FIG. 7. In some cases, UE 115-b may determine the first transmit power based on a first path loss associated with a first beam direction for the uplink transmission.

At 825, UE 115-b may transmit the uplink control information to base station 105-b using the determined transmit power during a first TTI. In some cases, UE 115-b transmits the control information in the first beam direction. In some cases, after transmitting the uplink control information to base station 105-b, at 830, UE 115-b may identify control information of the first transmission to be repeated during a second TTI, and UE 115-b may repeat the transmission of the control information in a second beam direction that is different from the first direction.

At 835, base station 105-b may optionally transmit second DCI to UE 115-b. In some cases, the second DCI schedules the repeated transmission of control information. Like the previously transmitted DCI, the second DCI may include an uplink grant, a TPC command, MCS index values, effective code rate index values, priority information (e.g., channel or transmission-type priority information), and the like. Also, like the previously transmitted DCI, the second DCI can be used to indicate power control information used to determine transmit power for repeated transmissions. For instance, the second DCI may include a TPC command for the repeated transmission of control information.

In some cases, the second DCI may include a TPC command indicating a repeated transmission to which the TPC command applies. In some cases, the second DCI is applicable to repeated transmission of control information that occur after a fixed delay from a time interval in which the second DCI is received. In some cases, the second DCI includes a TPC command relating to the second transmit power for the repeated control information transmissions that indicates step-sizes that are different from step-sizes in the TPC command relating to the first transmit power and transmitted in the previous DCI. In some cases, the TPC command includes a table that indicates a relationship between step-sizes and repetition indices for repeated transmissions of control information.

Accordingly, at 840, UE 115-b may be able to determine a second transmit power for the repeated transmission of the uplink control information during the second TTI, and at 845, UE 115-b may transmit the control information to base station 105-b using the second transmit power. In some cases, the transmit power for the retransmission is the same as the determined first transmit power. In other cases, the transmit power for the retransmission is different than the determined first transmit power. Additionally, in some examples, the step sizes included in the first DCI used to configure the first transmit power (e.g., +1, −1 dB) may be different from the step sizes included in the second DCI used to configure the second transmit power (e.g., +0.5, −0.5 dB). Further, UE 115-b may identify a second path loss associated with the second beam direction, and UE 115-b may determine the second transmit power based on the second path loss.

In some cases, UE 115-b may determine a second transmit power for the retransmission based on the second DCI. For instance, UE 115-b may determine the second transmit power based on the TPC command in the second DCI that indicates a second transmit power for retransmitting control information. And, in some examples, UE 115-*b* may determine the transmit power for the second transmission, and subsequent repeated transmissions, based on the table that indicates a relationship between step-sizes and a repetition index of the second transmission.

Figure 9:
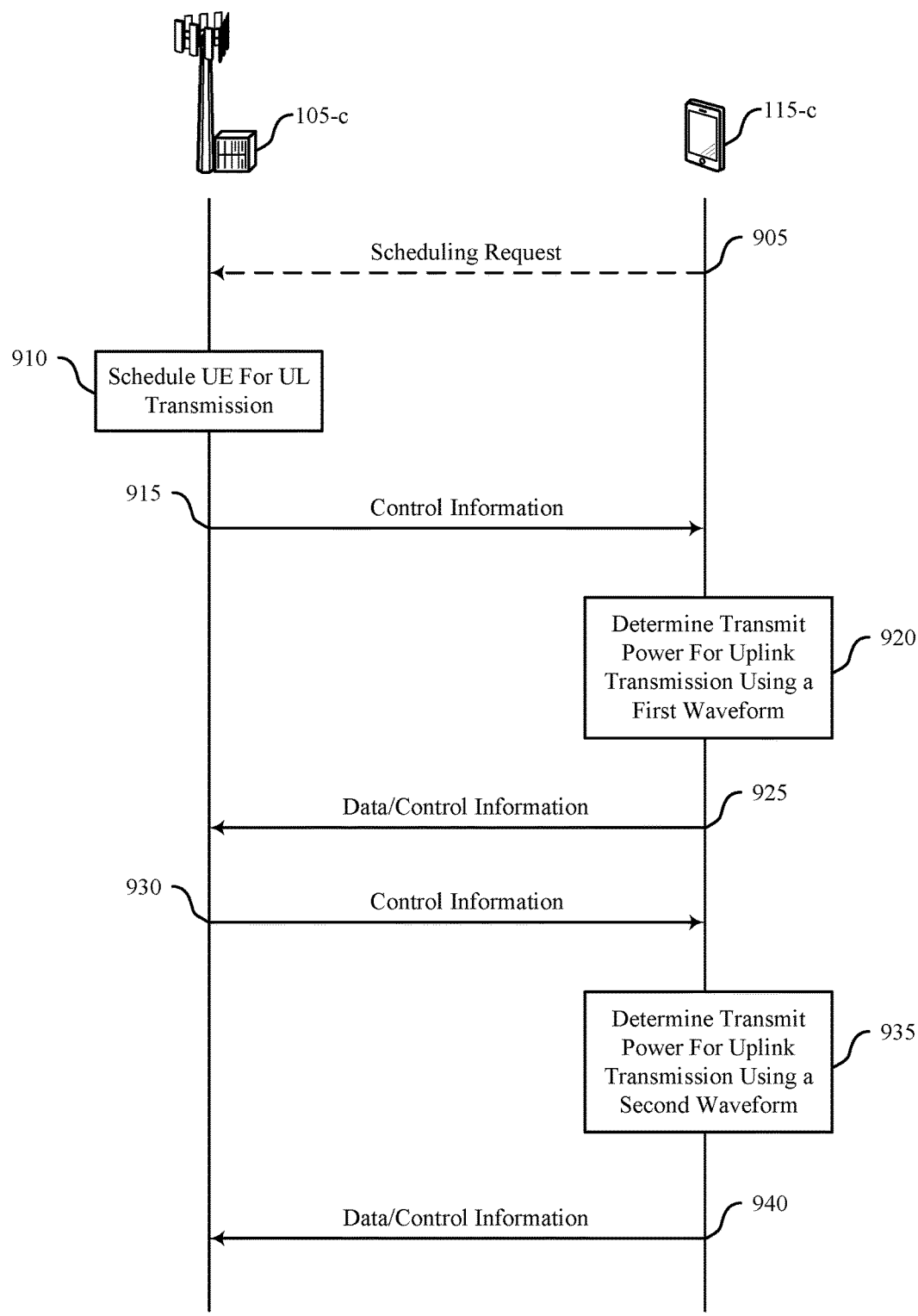

FIG. 9 illustrates an example of a process flow 900 for power control in NR systems in accordance with various aspects of the present disclosure. Process flow 900 illustrates aspects of techniques performed by a base station 105-*c*, which may be an example of a base station 105 described with reference to FIG. 1. Process flow 900 also illustrates aspects of techniques performed by a UE 115-*c*, which may be an example of a UE 115 described with reference to FIG. 1.

At 905, UE 115-*c* may identify data or control information to transmit to base station 105-*c*, and the UE 115-*c* may transmit a scheduling request to base station 105-*c* requesting resources for an uplink transmission. In other cases, UE 115-*c* may not transmit the scheduling request (e.g., if UE 115-*c* is scheduled on a persistent or semi-persistent basis). At 910, base station 105-*c* may schedule UE 115-*c* for an uplink transmission. For example, base station 105-*c* may identify resources for the uplink transmission, and base station 105-*c* may allocate these resource to UE 115-*c* for the uplink transmission.

At 915, base station 105-*b* may transmit control information (e.g., DCI) to UE 115-*c*. The control information may include an uplink grant, a TPC command, MCS index values, effective code rate index values, priority information (e.g., channel or transmission-type priority information), and the like. In some cases, the DCI indicates a waveform for the uplink transmission (e.g., OFDM waveform or a DFT-S-OFDM waveform). At 920, UE 115-*c* may determine a transmit power for the uplink transmission to base station 105-*b* in a first TTI using the first waveform based on a first set of one or more open-loop parameters associated with the first waveform, where the first set of one or more open-loop parameters is different from a second set of one or more open-loop parameters associated with a second waveform. At 925, UE 115-*c* may then transmit the uplink transmission to base station 105-*c* using the first waveform.

At 930, UE 115-*c* may then receive another DCI that schedules a transmission of data or control information using the second waveform in a second TTI. Accordingly, at 935, UE 115-*c* may determine a transmit power for the data or control information to be transmitted using the second waveform based on the second set of open-loop parameters, and, at 940, UE 115-*c* may transmit the data control information using the second waveform using the determined transmit power. In some examples, the TPC command included in the other DCI (i.e., received at 930), may include a first set of one or more closed-loop parameters associated with transitioning between the first waveform in the first TTI and the second waveform in the second TTI, and the first set of one or more closed-loop parameters may be different from a second set of one or more closed-loop parameters associated with successive transmissions associated with a same one of the first and second waveforms.

In some examples, the first and second sets of one or more open-loop parameters may include at least one of a maximum per-carrier power limit, a fractional path loss constant, a signal-to-interference-plus-noise ratio (SINR) target P0, an MCS based offset for different waveforms, and an closed-loop step-size. In some cases, each of the first waveform and the second waveform may include an OFDM waveform, a DFT-S-OFDM waveform, or other waveforms.

Figure 10:
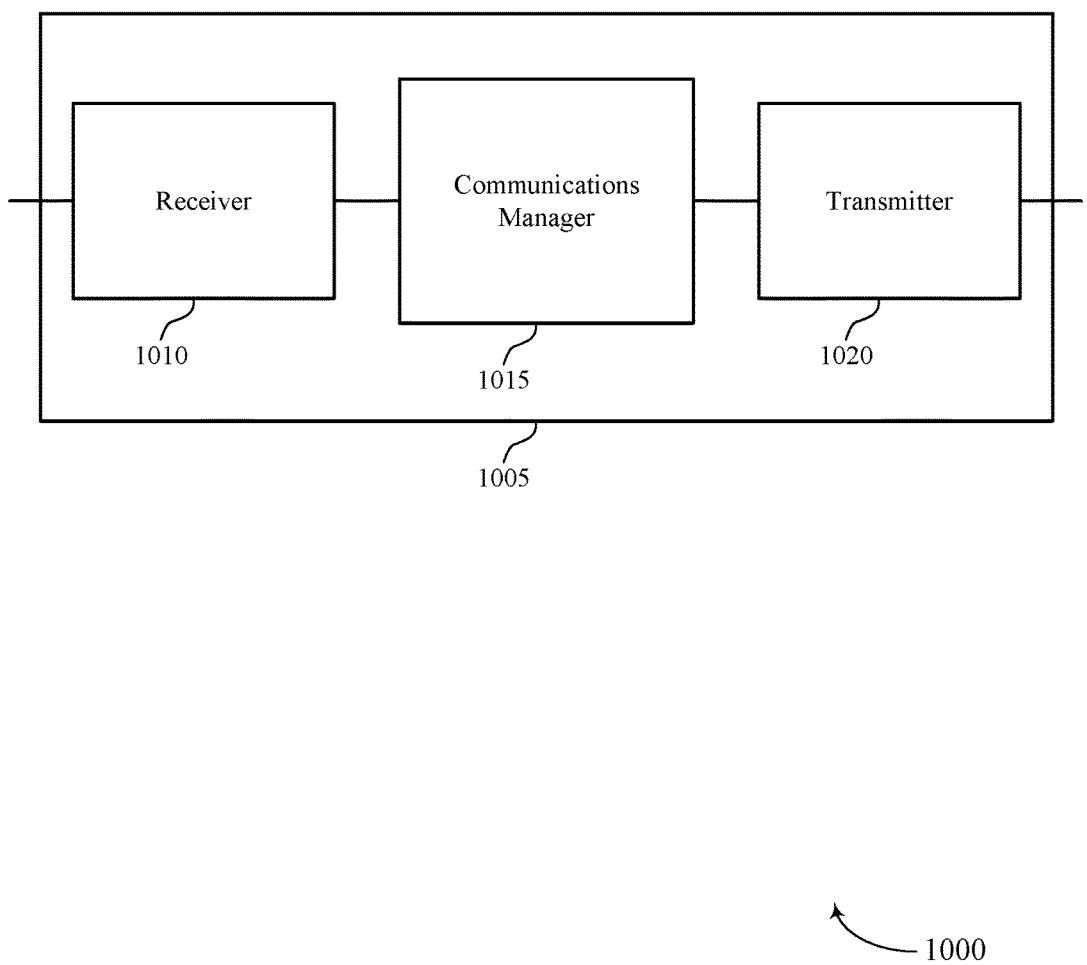
FIGS. 10-12 show block diagrams of a device that supports power control in NR systems in accordance with various aspects of the present disclosure.

FIG. 10 shows a block diagram 1000 of a wireless device 1005 that supports power control in NR systems in accordance with various aspects of the present disclosure. Wireless device 1005 may be an example of aspects of a UE 115 as described herein. Wireless device 1005 may include receiver 1010, communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to power control in NR systems, etc.). Information may be passed on to other components of the device. The receiver 1010 may be an example of aspects of the transceiver 1335 described with reference to FIG. 13. The receiver 1010 may utilize a single antenna or a set of antennas.

Communications manager 1015 may be an example of aspects of the communications manager 1315 described with reference to FIG. 13. Communications manager 1015 and/or at least some of its various sub-components may be implemented in hardware, software executed by a processor, firmware, or any combination thereof. If implemented in software executed by a processor, the functions of the communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 1015 and/or at least some of its various sub-components may be physically located at various positions, including being distributed such that portions of functions are implemented at different physical locations by one or more physical devices. In some examples, communications manager 1015 and/or at least some of its various sub-components may be a separate and distinct component in accordance with various aspects of the present disclosure. In other examples, communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1015 may determine a number of resource blocks allocated for control information to be transmitted in a control channel of a TTI, a payload size of the control information, and a number of resource elements of the resource blocks used for transmission of the control information, and determine a transmit power for the control channel during the TTI based on the number of resource blocks allocated for control information, the payload size of the control information, and the number of resource elements of the resource blocks used for transmission of the control information.

The communications manager 1015 may also identify control information of the first transmission to be repeated during a second TTI and determine a second transmit power for repeating transmission of the control information during the second TTI, where the first transmit power is different from the second transmit power. The communications manager 1015 may also identify data to be transmitted in a data channel during a TTI and determine a first transmit power for the data channel during the TTI based on a frequency division multiplexing of a portion of the data channel with a control channel during the TTI.

The communications manager 1015 may also determine that the first channel is frequency division multiplexed with a second channel associated with a second transmission priority that is higher than the first transmission priority in a portion of the TTI and determine a first transmit power for the second channel during the TTI independent of a second transmit power for the first channel during the TTI. The communications manager 1015 may also identify a first transmit power to be used for a first transmission associated with a first priority group, identify a second transmit power to be used for a second transmission associated with a second priority group, where the second transmission is frequency division multiplexed with the first transmission, and determine that a total of the first transmit power and the second transmit power exceeds a threshold. The communications manager 1015 may also determine a first transmit power for the data or control information based on a first set of one or more open-loop parameters associated with the first waveform, where the first set of one or more open-loop parameters is different from a second set of one or more open-loop parameters associated with a second waveform.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Transmitter 1020 may transmit the control information during the TTI using the determined transmit power. In some cases, transmitter 1020 may transmit the data or the control information in the first TTI using the determined transmit power. In some cases, transmitter 1020 may repeat the transmission of the control information in the control channel during the second TTI using the determined second transmit power. In some cases, transmitter 1020 may transmit the data in the data channel during the first TTI using the determined first transmit power. In some cases, transmitter 1020 may identify data or control information to be transmitted in a first channel during a TTI, the first channel associated with a first transmission priority. In some cases, transmitter 1020 may perform a first transmission of control information in a control channel during a first TTI using a first transmit power.

In some cases, transmitter 1020 may transmit either the first transmission or the second transmission based on the determination and a comparison of a first priority of the first priority group to a second priority of the second priority group. In some cases, transmitter 1020 may transmit the first transmission and refraining from transmitting the second transmission based on the determination. In some cases, transmitter 1020 may identify data or control information to transmit in a first TTI using a first waveform. In some cases, transmitter 1020 may transmit the second channel during the TTI using the determined first transmit power.

In some cases, the first transmission of the control information is in a first beam direction, and where repeating the transmission of the control information includes: repeating the transmission of the control information in a second beam direction that is different from the first beam direction. In some cases, the first channel or second channel includes one of a channel used for URLLC of control or data, a channel used for eMBB communication, a PUCCH, a PUSCH, or a channel used for SRS transmissions. In some cases, the second transmission includes a SRS transmission.

Figure 11:
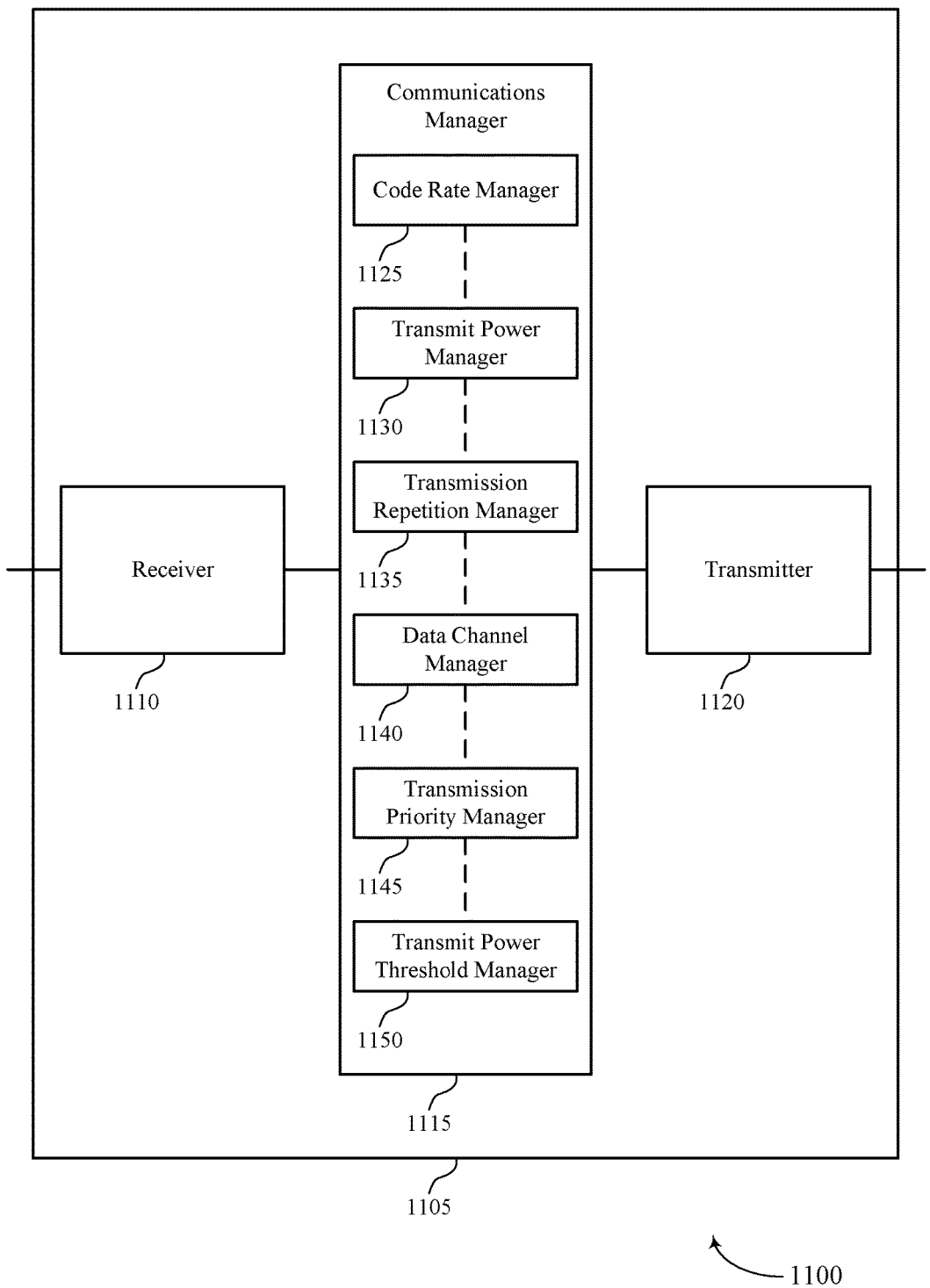

FIG. 11 shows a block diagram 1100 of a wireless device 1105 that supports power control in NR systems in accordance with various aspects of the present disclosure. Wireless device 1105 may be an example of aspects of a wireless device 1005 or a UE 115 as described with reference to FIG. 10. Wireless device 1105 may include receiver 1110, communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to power control in NR systems, etc.). Information may be passed on to other components of the device. The receiver 1110 may be an example of aspects of the transceiver 1335 described with reference to FIG. 13. The receiver 1110 may utilize a single antenna or a set of antennas.

Communications manager 1115 may be an example of aspects of the communications manager 1315 described with reference to FIG. 13. Communications manager 1115 may include code rate manager 1125, transmit power manager 1130, transmission repetition manager 1135, data channel manager 1140, transmission priority manager 1145, and transmit power threshold manager 1150.

Code rate manager 1125 may determine a number of resource blocks allocated for control information to be transmitted in a control channel of a TTI, a payload size of the control information, and a number of resource elements of the resource blocks used for transmission of the control information. Transmit power manager 1130 may determine a transmit power for the control channel during the TTI based on the number of resource blocks allocated for control information, the payload size of the control information, and the number of resource elements of the resource blocks used for transmission of the control information. In some cases, transmit power manager 1130 may determine a second transmit power for repeating transmission of the control information during the second TTI, where the first transmit power is different from the second transmit power. In some cases, transmit power manager 1130 may determine a first transmit power for the data channel during the TTI based on a frequency division multiplexing of a portion of the data channel with a control channel during the TTI. In some cases, transmit power manager 1130 may determine the first transmit power for the data channel of the TTI independent of a second transmit power for the control channel during the TTI.

In some cases, transmit power manager 1130 may determine a second transmit power for the portion of the data channel during the TTI based on a third transmit power for the control channel during the TTI. In some cases, transmit power manager 1130 may determine a fourth transmit power for a remaining portion of the data channel during the first TTI that is not frequency division multiplexed with the control channel, where the fourth transmit power is greater than the second transmit power for the portion of the data channel frequency division multiplexed with the control channel. In some cases, transmit power manager 1130 may determine a first transmit power for the second channel during the TTI independent of a second transmit power for the first channel during the TTI. In some cases, transmit power manager 1130 may determine the transmit power for the control channel during the TTI is further based on a message format of the control channel.

In some cases, transmit power manager 1130 may determine the first transmission priority based on a type of the first channel and the second transmission priority based on a type of the second channel. In some cases, transmit power manager 1130 may determine the first transmission priority based on a payload of the first channel and the second transmission priority based on a payload of the second channel. In some cases, transmit power manager 1130 may identify a first transmit power to be used for a first transmission associated with a first priority group. In some cases, transmit power manager 1130 may identify a second transmit power to be used for a second transmission associated with a second priority group, where the second transmission is frequency division multiplexed with the first transmission. In some cases, transmit power manager 1130 may determine a first transmit power for the data or control information based on a first set of one or more open-loop parameters associated with the first waveform, where the first set of one or more open-loop parameters is different from a second set of one or more open-loop parameters associated with a second waveform.

In some cases, transmit power manager 1130 may determine a second transmit power for the transmission of the data or control information in the second TTI based on a TPC command included in the downlink control information (DCI). In some cases, transmit power manager 1130 may determine the second transmit power for the first channel based on the first transmit power and a maximum carrier power limit. In some cases, each of the first waveform and the second waveform includes an orthogonal frequency division multiplexing (OFDM) waveform or a discrete Fourier transform (DFT)-spread OFDM waveform. In some cases, each of the first and second sets of one or more open-loop parameters includes at least one of a maximum carrier power limit, a fractional path loss constant, a signal-to-interference-plus-noise ratio (SINR) target P0, a modulation and coding scheme (MCS) based offset for different waveforms, and an closed-loop step-size.

Transmission repetition manager 1135 may identify control information of the first transmission to be repeated during a second TTI. Data channel manager 1140 may identify data to be transmitted in a data channel during a TTI. Transmission priority manager 1145 may determine that the first channel is frequency division multiplexed with a second channel associated with a second transmission priority that is higher than the first transmission priority in a portion of the TTI and determine that the first priority group is associated with a higher priority than the second priority group. In some cases, each of the first transmission group and the second transmission group is associated with one or more transmission types having equal priority.

Transmit power threshold manager 1150 may determine that a total of the first transmit power and the second transmit power exceeds a threshold. In some cases, the second transmission is frequency division multiplexed with the first transmission in at least one symbol period, and where determining that the total of the first transmit power and the second transmit power exceeds a threshold includes determining that the total of the first transmit power and the second transmit power in the at least one symbol period exceeds the threshold.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
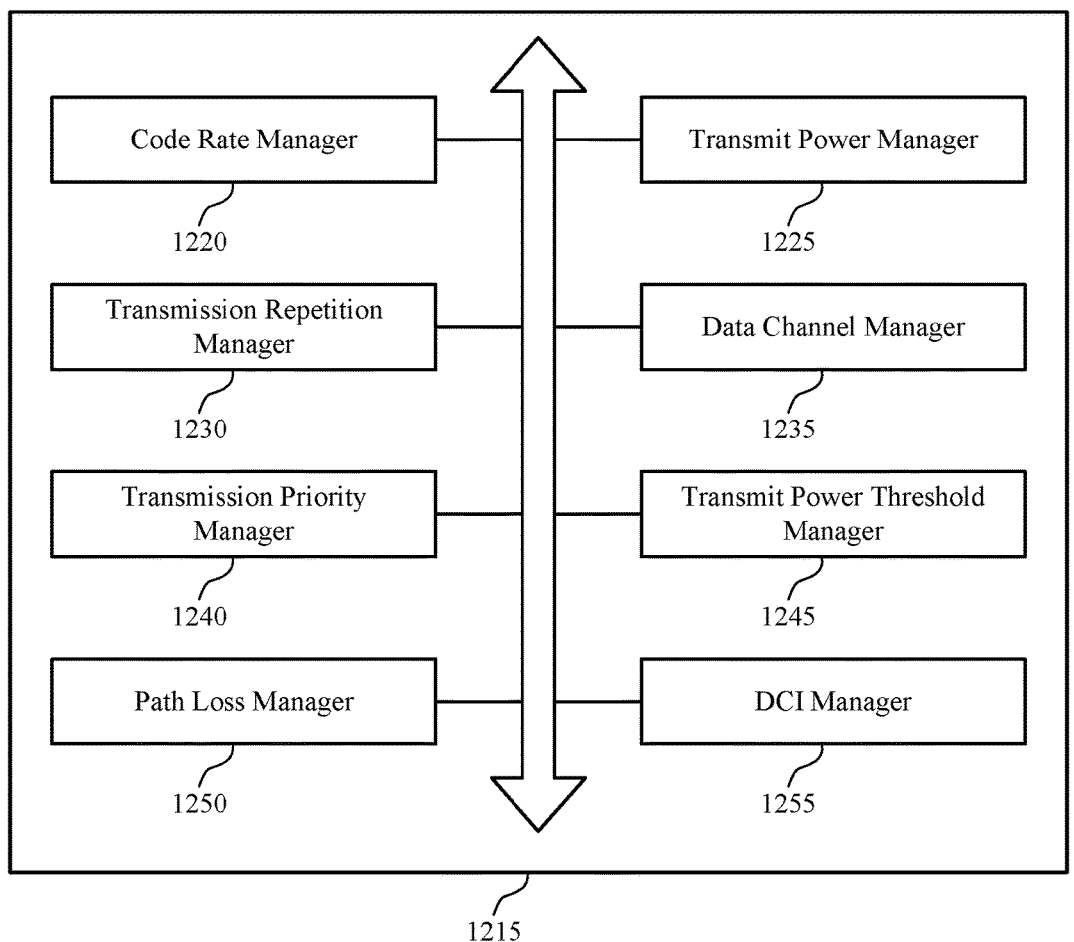

FIG. 12 shows a block diagram 1200 of a communications manager 1215 that supports power control in NR systems in accordance with various aspects of the present disclosure. The communications manager 1215 may be an example of aspects of a communications manager 1015, a communications manager 1115, or a communications manager 1315 described with reference to FIGS. 10, 11, and 13. The communications manager 1215 may include code rate manager 1220, transmit power manager 1225, transmission repetition manager 1230, data channel manager 1235, transmission priority manager 1240, transmit power threshold manager 1245, path loss manager 1250, and DCI manager 1255. Each of these modules may communicate, directly or indirectly, with one another (e.g., via one or more buses).

Code rate manager 1220 may determine a number of resource blocks allocated for control information to be transmitted in a control channel of a TTI, a payload size of the control information, and a number of resource elements of the resource blocks used for transmission of the control information. In some cases, code rate manager 1220 may determine an effective code rate for the control information based at least in part on the number of resource blocks allocated for control information, the payload size of the control information, and the number of resource elements of the resource blocks used for transmission of the control information, where the transmit power is determined based at least in part on the effective code rate.

Transmit power manager 1225 may determine a transmit power for the control channel during the TTI based on the number of resource blocks allocated for control information, the payload size of the control information, and the number of resource elements of the resource blocks used for transmission of the control information. In some cases, transmit power manager 1225 may determine a second transmit power for repeating transmission of the control information during the second TTI, where the first transmit power is different from the second transmit power. In some cases, transmit power manager 1225 may determine a first transmit power for the data channel during the TTI based on a frequency division multiplexing of a portion of the data channel with a control channel during the TTI. In some cases, transmit power manager 1225 may determine the first transmit power for the data channel of the TTI independent of a second transmit power for the control channel during the TTI.

In some cases, transmit power manager 1225 may determine a second transmit power for the portion of the data channel during the TTI based on a third transmit power for the control channel during the TTI. In some cases, transmit power manager 1225 may determine a fourth transmit power for a remaining portion of the data channel during the first TTI that is not frequency division multiplexed with the control channel, where the fourth transmit power is greater than the second transmit power for the portion of the data channel frequency division multiplexed with the control channel. In some cases, transmit power manager 1225 may determine a first transmit power for the second channel during the TTI independent of a second transmit power for the first channel during the TTI. In some cases, transmit power manager 1225 may determine the transmit power for the control channel during the TTI is further based on a message format of the control channel.

In some cases, transmit power manager 1225 may determine the first transmission priority based on a type of the first channel and the second transmission priority based on a type of the second channel. In some cases, transmit power manager 1225 may determine the first transmission priority based on a payload of the first channel and the second transmission priority based on a payload of the second channel. In some cases, transmit power manager 1225 may identify a first transmit power to be used for a first transmission associated with a first priority group. In some cases, transmit power manager 1225 may identify a second transmit power to be used for a second transmission associated with a second priority group, where the second transmission is frequency division multiplexed with the first transmission.

In some cases, transmit power manager 1225 may determine a first transmit power for the data or control information based on a first set of one or more open-loop parameters associated with the first waveform, where the first set of one or more open-loop parameters is different from a second set of one or more open-loop parameters associated with a second waveform, determine a second transmit power for the transmission of the data or control information in the second TTI based on a TPC command included in the DCI, and determine the second transmit power for the first channel based on the first transmit power and a maximum carrier power limit. In some cases, each of the first waveform and the second waveform includes an OFDM waveform or a DFT-S-OFDM waveform. In some cases, each of the first and second sets of one or more open-loop parameters includes at least one of a maximum carrier power limit, a fractional path loss constant, a SINR target P0, a MCS based offset for different waveforms, and an closed-loop step-size.

Transmission repetition manager 1230 may identify control information of the first transmission to be repeated during a second TTI. Data channel manager 1235 may identify data to be transmitted in a data channel during a TTI. Transmission priority manager 1240 may determine that the first channel is frequency division multiplexed with a second channel associated with a second transmission priority that is higher than the first transmission priority in a portion of the TTI and determine that the first priority group is associated with a higher priority than the second priority group. In some cases, each of the first transmission group and the second transmission group is associated with one or more transmission types having equal priority.

Transmit power threshold manager 1245 may determine that a total of the first transmit power and the second transmit power exceeds a threshold. In some cases, the second transmission is frequency division multiplexed with the first transmission in at least one symbol period, and where determining that the total of the first transmit power and the second transmit power exceeds a threshold includes: determining that the total of the first transmit power and the second transmit power in the at least one symbol period exceeds the threshold.

Path loss manager 1250 may identify a first path loss associated with the first transmission of the control information, where the first transmit power is determined based on the first path loss and identify a second path loss associated with the repeated transmission of the control information, where the second transmit power is determined based on the second path loss.

DCI manager 1255 may receive DCI that includes a TPC command relating to the second transmit power for repeating the transmission of the control information, where the second transmit power is determined based on the TPC command. In some cases, DCI manager 1255 may identify a table in the TPC command that indicates a relationship between step-sizes and repetition indices for repeated transmissions of control information, where the second transmit power is determined based on the table and a repetition index of the repeated transmission. In some cases, DCI manager 1255 may receive DCI that schedules a transmission of data or control information using the second waveform in a second TTI. In some cases, the DCI further indicates whether the TPC command is applicable to the repeated transmission of the control information.

In some cases, the DCI further indicates a repeated transmission to which the TPC command applies. In some cases, the DCI is applicable to repeated transmissions of control information scheduled after a fixed delay from a time interval in which the DCI is received. In some cases, a first set of one or more step-sizes in the TPC command relating to the second transmit power for repeating the transmission of the control information is different from a second set of one or more step-sizes in another TPC command relating to the first transmit power. In some cases, the TPC command includes a first set of one or more closed-loop parameters associated with transitioning between the first waveform in the first TTI and the second waveform in the second TTI, and the first set of one or more closed-loop parameters is different from a second set of one or more of closed-loop parameters associated with successive transmissions associated with a same one of the first and second waveforms.

Figure 13:
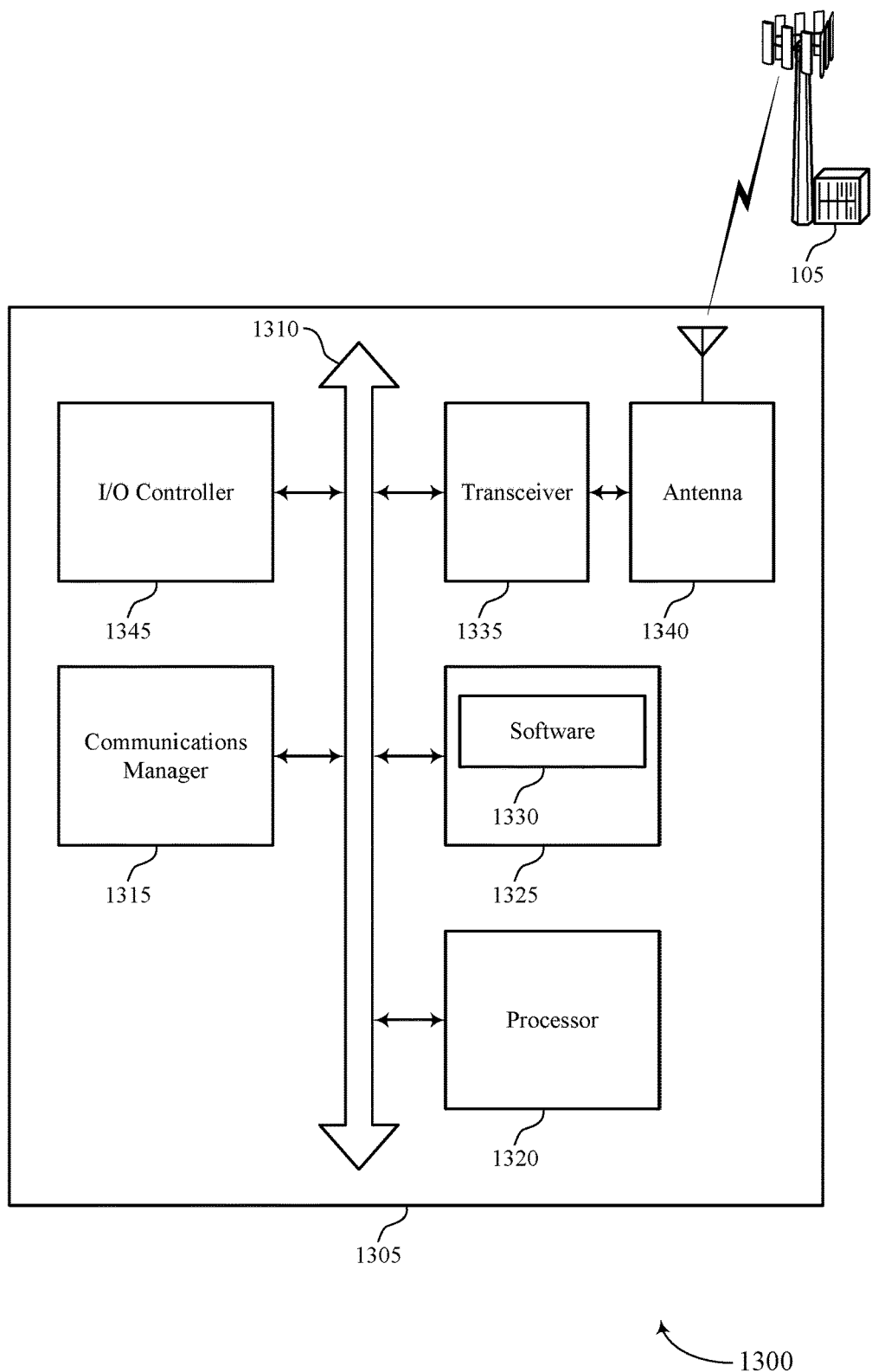
FIG. 13 illustrates a block diagram of a system including a UE that supports power control in NR systems in accordance with various aspects of the present disclosure.

FIG. 13 shows a diagram of a system 1300 including a device 1305 that supports power control in NR systems in accordance with various aspects of the present disclosure. Device 1305 may be an example of or include the components of wireless device 1005, wireless device 1105, or a UE 115 as described above, e.g., with reference to FIGS. 10 and 11. Device 1305 may include components for bi-directional voice and data communications including components for transmitting and receiving communications, including communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting power control in NR systems).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support power control in NR systems. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
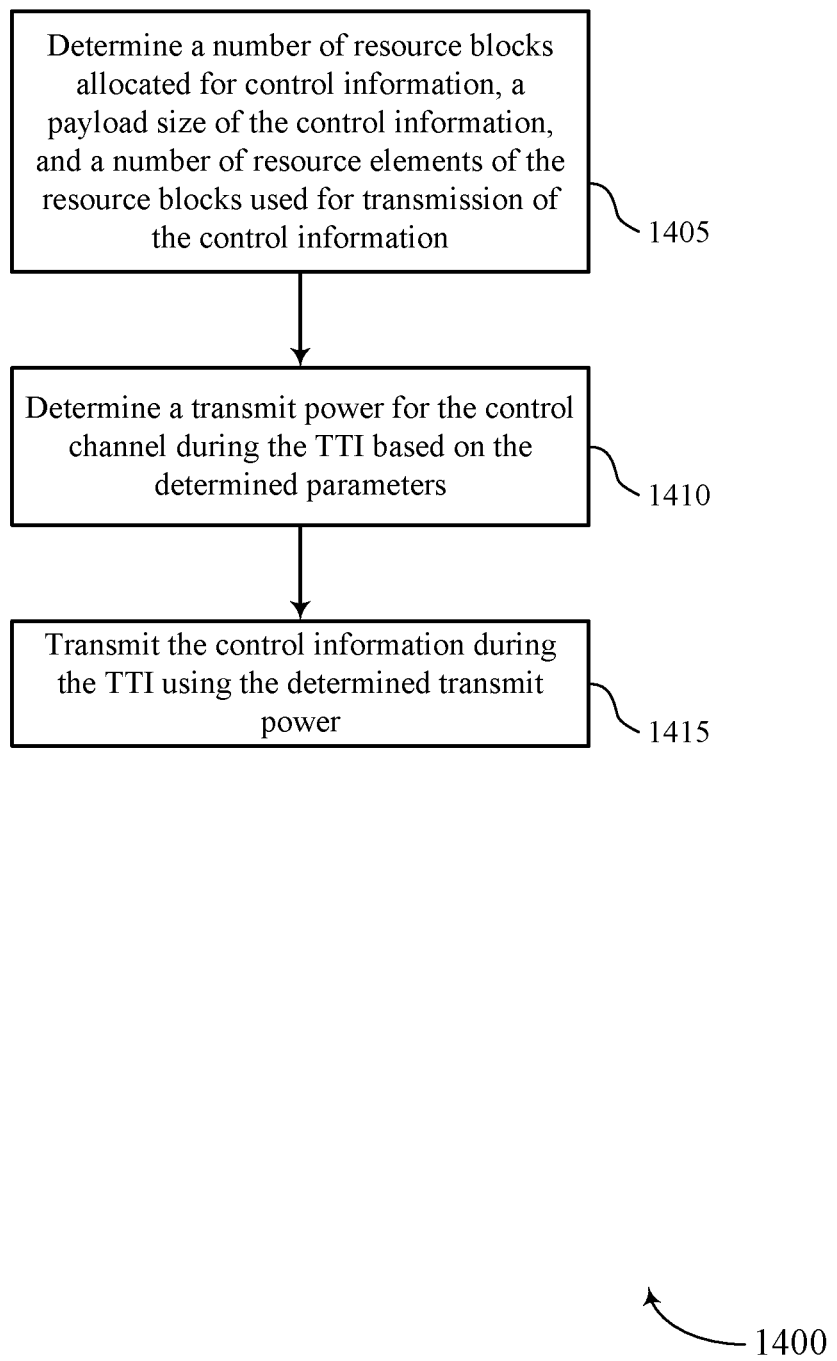
FIGS. 14-19 illustrate methods for power control in NR systems in accordance with various aspects of the present disclosure.

FIG. 14 shows a flowchart illustrating a method 1400 for power control in NR systems in accordance with various aspects of the present disclosure. The operations of method 1400 may be implemented by a UE 115 or its components as described herein. For example, the operations of method 1400 may be performed by a communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may determine a number of resource blocks allocated for control information to be transmitted in a control channel of a TTI, a payload size of the control information, and a number of resource elements of the resource blocks used for transmission of the control information. The operations of block 1405 may be performed according to the methods described herein. In certain examples, aspects of the operations of block 1405 may be performed by a code rate manager as described with reference to FIGS. 10 through 13.

At block 1410 the UE 115 may determine a transmit power for the control channel during the TTI based at least in part on the number of resource blocks allocated for control information, the payload size of the control information, and the number of resource elements of the resource blocks used for transmission of the control information. The operations of block 1410 may be performed according to the methods described herein. In certain examples, aspects of the operations of block 1410 may be performed by a transmit power manager as described with reference to FIGS. 10 through 13.

At block 1415 the UE 115 may transmit the control information during the TTI using the determined transmit power. The operations of block 1415 may be performed according to the methods described herein. In certain examples, aspects of the operations of block 1415 may be performed by a transmitter as described with reference to FIGS. 10 through 13.

Figure 15:
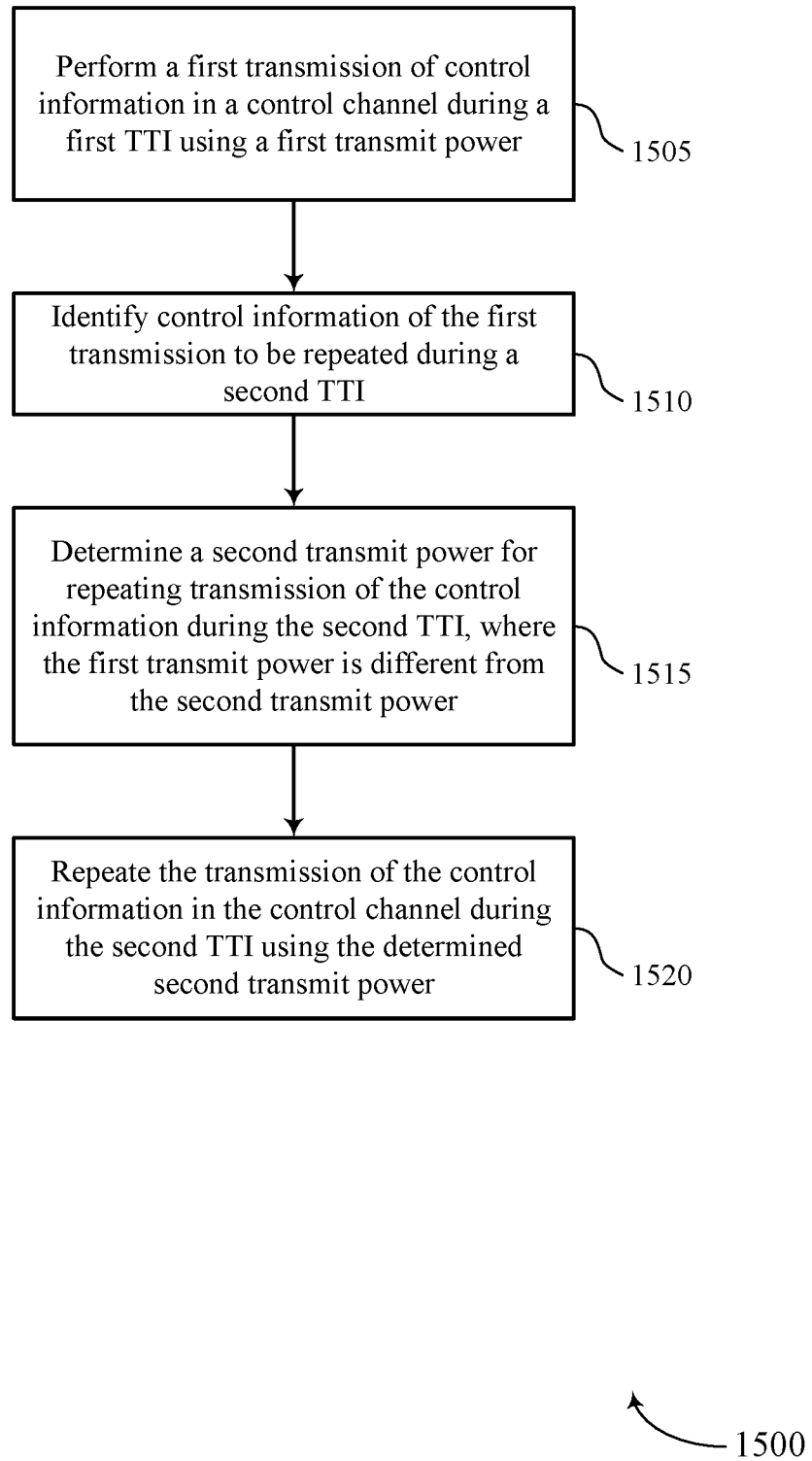

FIG. 15 shows a flowchart illustrating a method 1500 for power control in NR systems in accordance with various aspects of the present disclosure. The operations of method 1500 may be implemented by a UE 115 or its components as described herein. For example, the operations of method 1500 may be performed by a communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may perform a first transmission of control information in a control channel during a first TTI using a first transmit power. The operations of block 1505 may be performed according to the methods described herein. In certain examples, aspects of the operations of block 1505 may be performed by a transmitter as described with reference to FIGS. 10 through 13.

At block 1510 the UE 115 may identify control information of the first transmission to be repeated during a second TTI. The operations of block 1510 may be performed according to the methods described herein. In certain examples, aspects of the operations of block 1510 may be performed by a transmission repetition manager as described with reference to FIGS. 10 through 13.

At block 1515 the UE 115 may determine a second transmit power for repeating transmission of the control information during the second TTI, wherein the first transmit power is different from the second transmit power. The operations of block 1515 may be performed according to the methods described herein. In certain examples, aspects of the operations of block 1515 may be performed by a transmit power manager as described with reference to FIGS. 10 through 13.

At block 1520 the UE 115 may repeat the transmission of the control information in the control channel during the second TTI using the determined second transmit power. The operations of block 1520 may be performed according to the methods described herein. In certain examples, aspects of the operations of block 1520 may be performed by a transmitter as described with reference to FIGS. 10 through 13.

Figure 16:
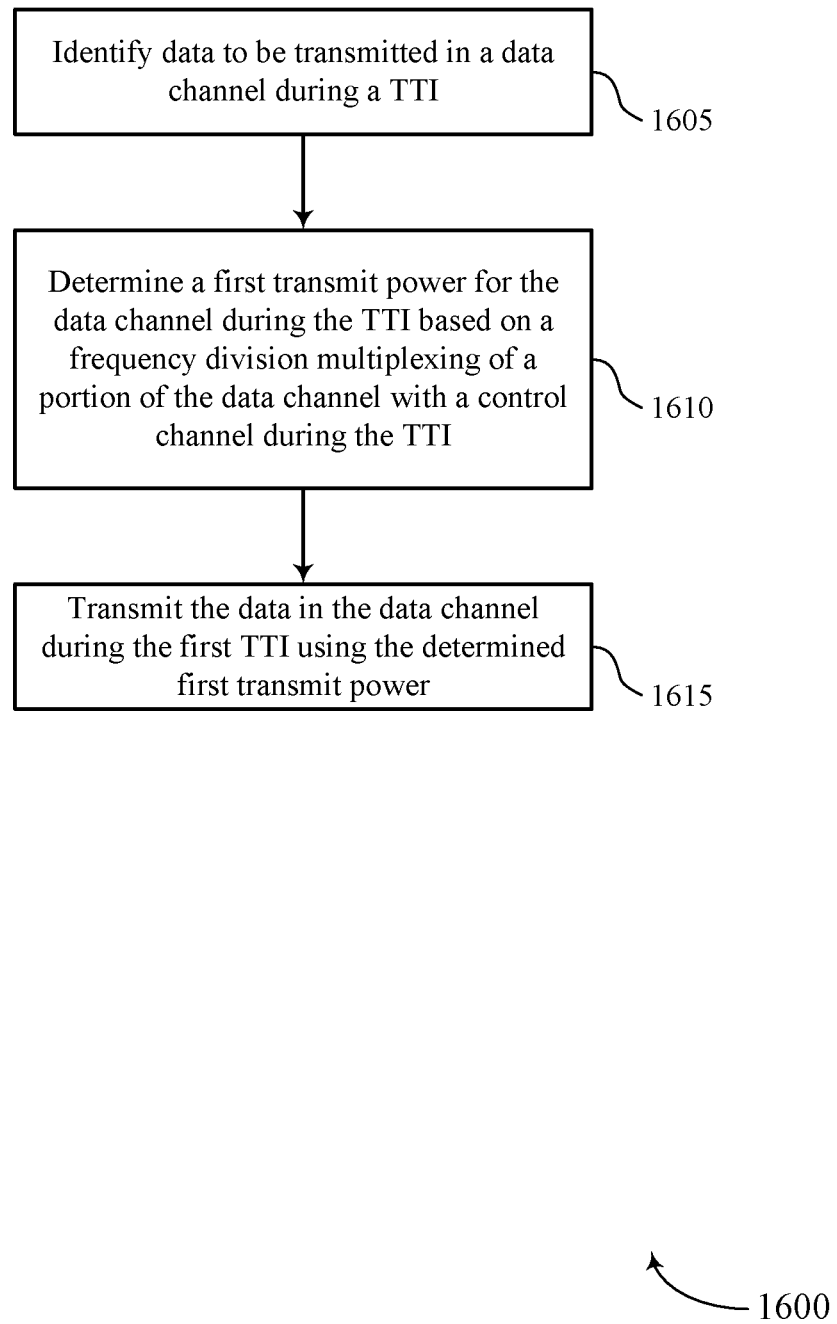

FIG. 16 shows a flowchart illustrating a method 1600 for power control in NR systems in accordance with various aspects of the present disclosure. The operations of method 1600 may be implemented by a UE 115 or its components as described herein. For example, the operations of method 1600 may be performed by a communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify data to be transmitted in a data channel during a TTI. The operations of block 1605 may be performed according to the methods described herein. In certain examples, aspects of the operations of block 1605 may be performed by a data channel manager as described with reference to FIGS. 10 through 13.

At block 1610 the UE 115 may determine a first transmit power for the data channel during the TTI based at least in part on a frequency division multiplexing of a portion of the data channel with a control channel during the TTI. The operations of block 1610 may be performed according to the methods described herein. In certain examples, aspects of the operations of block 1610 may be performed by a transmit power manager as described with reference to FIGS. 10 through 13.

At block 1615 the UE 115 may transmit the data in the data channel during the first TTI using the determined first transmit power. The operations of block 1615 may be performed according to the methods described herein. In certain examples, aspects of the operations of block 1615 may be performed by a transmitter as described with reference to FIGS. 10 through 13.

Figure 17:
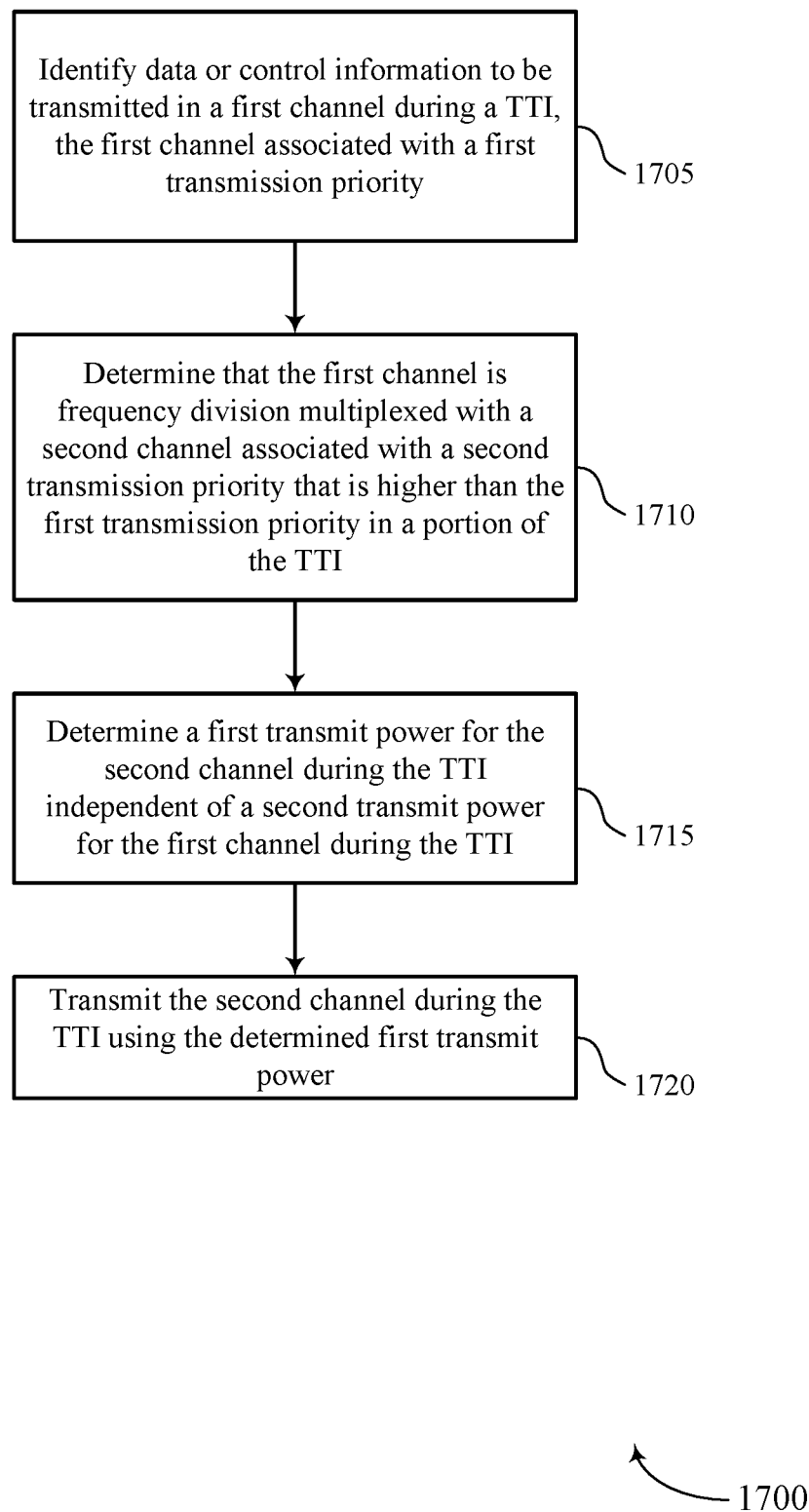

FIG. 17 shows a flowchart illustrating a method 1700 for power control in NR systems in accordance with various aspects of the present disclosure. The operations of method 1700 may be implemented by a UE 115 or its components as described herein. For example, the operations of method 1700 may be performed by a communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify data or control information to be transmitted in a first channel during a TTI, the first channel associated with a first transmission priority. The operations of block 1705 may be performed according to the methods described herein. In certain examples, aspects of the operations of block 1705 may be performed by a transmitter as described with reference to FIGS. 10 through 13.

At block 1710 the UE 115 may determine that the first channel is frequency division multiplexed with a second channel associated with a second transmission priority that is higher than the first transmission priority in a portion of the TTI. The operations of block 1710 may be performed according to the methods described herein. In certain examples, aspects of the operations of block 1710 may be performed by a transmission priority manager as described with reference to FIGS. 10 through 13.

At block 1715 the UE 115 may determine a first transmit power for the second channel during the TTI independent of a second transmit power for the first channel during the TTI. The operations of block 1715 may be performed according to the methods described herein. In certain examples, aspects of the operations of block 1715 may be performed by a transmit power manager as described with reference to FIGS. 10 through 13.

At block 1720 the UE 115 may transmit the second channel during the TTI using the determined first transmit power. The operations of block 1720 may be performed according to the methods described herein. In certain examples, aspects of the operations of block 1720 may be performed by a transmitter as described with reference to FIGS. 10 through 13.

Figure 18:
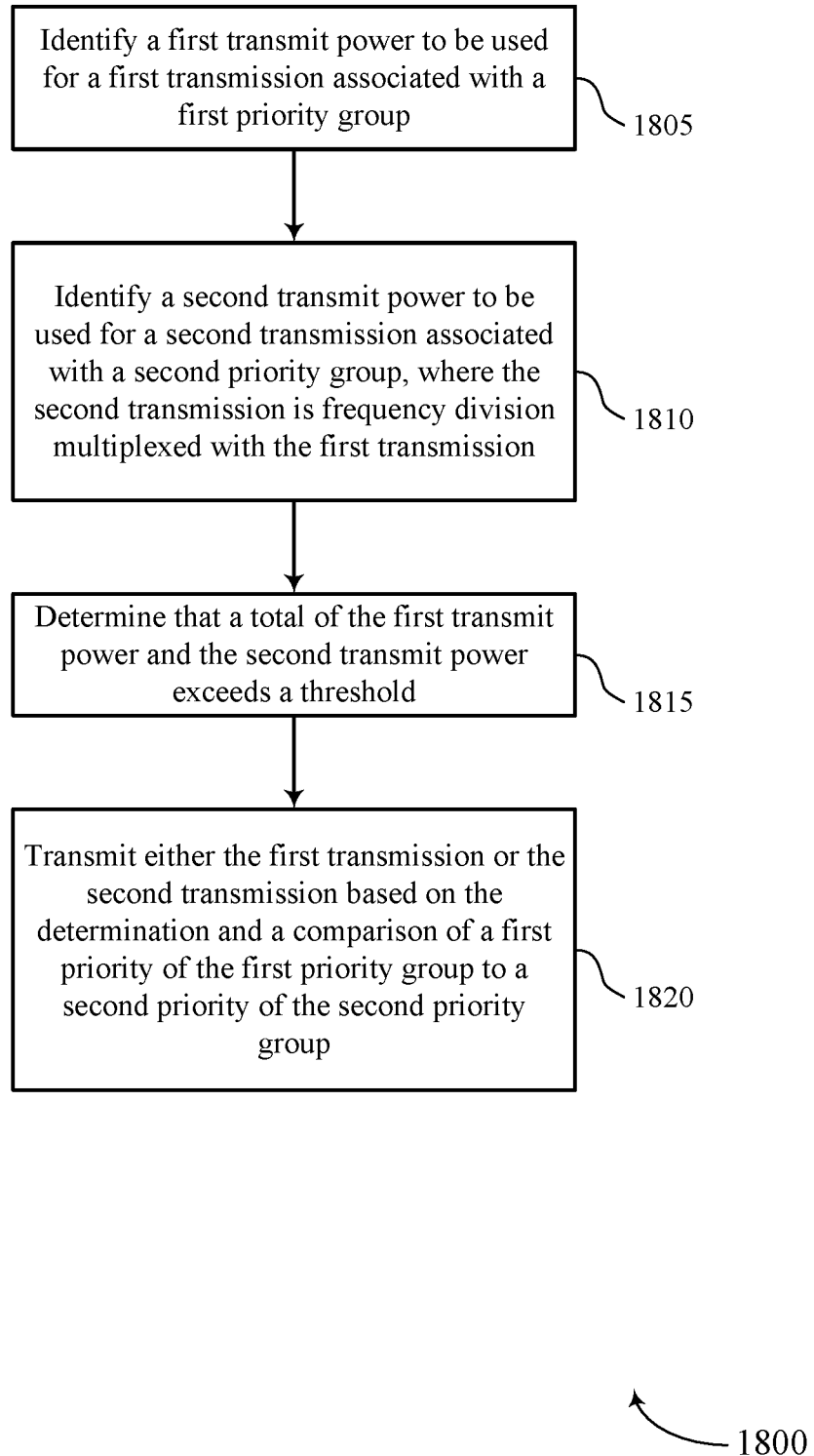

FIG. 18 shows a flowchart illustrating a method 1800 for power control in NR systems in accordance with various aspects of the present disclosure. The operations of method 1800 may be implemented by a UE 115 or its components as described herein. For example, the operations of method 1800 may be performed by a communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may identify a first transmit power to be used for a first transmission associated with a first priority group. The operations of block 1805 may be performed according to the methods described herein. In certain examples, aspects of the operations of block 1805 may be performed by a transmit power manager as described with reference to FIGS. 10 through 13.

At block 1810 the UE 115 may identify a second transmit power to be used for a second transmission associated with a second priority group, wherein the second transmission is frequency division multiplexed with the first transmission. The operations of block 1810 may be performed according to the methods described herein. In certain examples, aspects of the operations of block 1810 may be performed by a transmit power manager as described with reference to FIGS. 10 through 13.

At block 1815 the UE 115 may determine that a total of the first transmit power and the second transmit power exceeds a threshold. The operations of block 1815 may be performed according to the methods described herein. In certain examples, aspects of the operations of block 1815 may be performed by a transmit power threshold manager as described with reference to FIGS. 10 through 13.

At block 1820 the UE 115 may transmit either the first transmission or the second transmission based at least in part on the determination and a comparison of a first priority of the first priority group to a second priority of the second priority group. The operations of block 1820 may be performed according to the methods described herein. In certain examples, aspects of the operations of block 1820 may be performed by a transmitter as described with reference to FIGS. 10 through 13.

Figure 19:
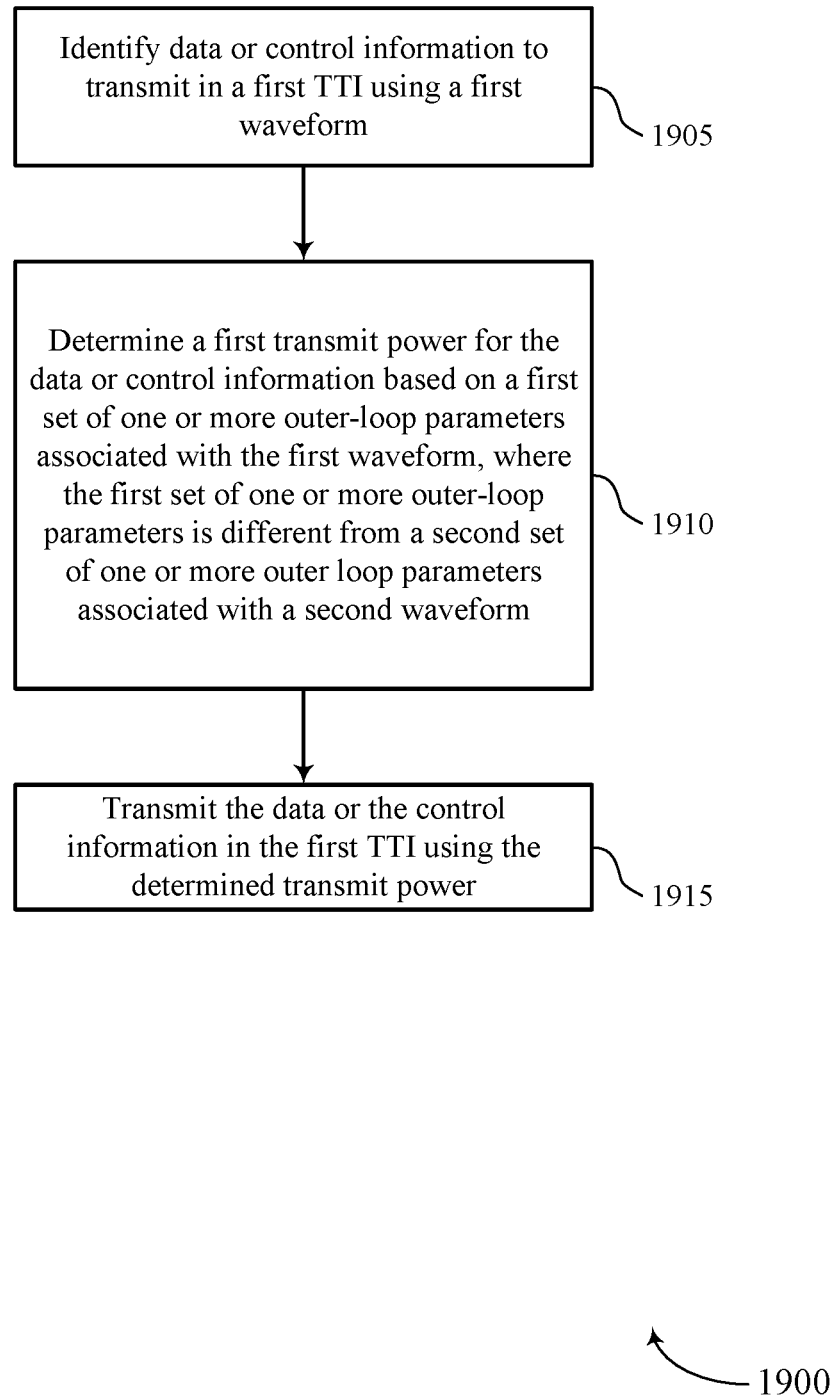

FIG. 19 shows a flowchart illustrating a method 1900 for power control in NR systems in accordance with various aspects of the present disclosure. The operations of method 1900 may be implemented by a UE 115 or its components as described herein. For example, the operations of method 1900 may be performed by a communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may identify data or control information to transmit in a first TTI using a first waveform. The operations of block 1905 may be performed according to the methods described herein. In certain examples, aspects of the operations of block 1905 may be performed by a transmitter as described with reference to FIGS. 10 through 13.

At block 1910 the UE 115 may determine a first transmit power for the data or control information based at least in part on a first set of one or more open-loop parameters associated with the first waveform, wherein the first set of one or more open-loop parameters is different from a second set of one or more open-loop parameters associated with a second waveform. The operations of block 1910 may be performed according to the methods described herein. In certain examples, aspects of the operations of block 1910 may be performed by a transmit power manager as described with reference to FIGS. 10 through 13.

At block 1915 the UE 115 may transmit the data or the control information in the first TTI using the determined transmit power. The operations of block 1915 may be performed according to the methods described herein. In certain examples, aspects of the operations of block 1915 may be performed by a transmitter as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   performing a first transmission of control information in a control channel during a first transmission time interval (TTI) using a first transmit power;
   identifying control information of the first transmission to be repeated during a second TTI;
   receiving downlink control information (DCI) that includes a transmit power control (TPC) command relating to a second transmit power for repeating a transmission of the control information, wherein the DCI is applicable to repeated transmissions of control information scheduled after a fixed delay from a time interval in which the DCI is received:
   determining the second transmit power for repeating transmission of the control information during the second TTI based at least in part on the TPC command, wherein the first transmit power is different from the second transmit power; and
   repeating the transmission of the control information in the control channel during the second TTI using the determined second transmit power.

2. The method of claim 1, wherein the first transmission of the control information is in a first beam direction, and wherein repeating the transmission of the control information comprises:
   repeating the transmission of the control information in a second beam direction that is different from the first beam direction.

3. The method of claim 1, further comprising:
   identifying a first path loss associated with the first transmission of the control information, wherein the first transmit power is determined based at least in part on the first path loss; and
   identifying a second path loss associated with the repeated transmission of the control information, wherein the second transmit power is determined based at least in part on the second path loss.

4. The method of claim 1, wherein the DCI further indicates whether the TPC command is applicable to the repeated transmission of the control information.

5. The method of claim 4, wherein the DCI further indicates a repeated transmission to which the TPC command applies.

6. The method of claim 1, wherein a first set of one or more step-sizes in the TPC command relating to the second transmit power for repeating the transmission of the control information is different from a second set of one or more step-sizes in another TPC command relating to the first transmit power.

7. The method of claim 1, further comprising:
identifying a table in the TPC command that indicates a relationship between step-sizes and repetition indices for repeated transmissions of control information, wherein the second transmit power is determined based at least in part on the table and a repetition index of the repeated transmission.

8. An apparatus for wireless communication, comprising:
means for performing a first transmission of control information in a control channel during a first transmission time interval (TTI) using a first transmit power;
means for identifying control information of the first transmission to be repeated during a second TTI;
means for receiving downlink control information (DCI) that includes a transmit power control (TPC) command relating to a second transmit power for repeating a transmission of the control information, wherein the DCI is applicable to repeated transmissions of control information scheduled after a fixed delay from a time interval in which the DCI is received;
means for determining the second transmit power for repeating transmission of the control information during the second TTI based at least in part on the TPC command, wherein the first transmit power is different from the second transmit power; and
means for repeating the transmission of the control information in the control channel during the second TTI using the determined second transmit power.

9. The apparatus of claim 8, wherein the first transmission of the control information is in a first beam direction, and wherein the means for repeating the transmission of the control information comprises:
means for repeating the transmission of the control information in a second beam direction that is different from the first beam direction.

10. The apparatus of claim 8, further comprising:
means for identifying a first path loss associated with the first transmission of the control information, wherein the first transmit power is determined based at least in part on the first path loss; and
means for identifying a second path loss associated with the repeated transmission of the control information, wherein the second transmit power is determined based at least in part on the second path loss.

11. The apparatus of claim 8, wherein the DCI further indicates whether the TPC command is applicable to the repeated transmission of the control information.

12. The apparatus of claim 11, wherein the DCI further indicates a repeated transmission to which the TPC command applies.

13. The apparatus of claim 8, wherein a first set of one or more step-sizes in the TPC command relating to the second transmit power for repeating the transmission of the control information is different from a second set of one or more step-sizes in another TPC command relating to the first transmit power.

14. The apparatus of claim 8, further comprising:
means for identifying a table in the TPC command that indicates a relationship between step-sizes and repetition indices for repeated transmissions of control information, wherein the second transmit power is determined based at least in part on the table and a repetition index of the repeated transmission.

15. A mobile device for wireless communication, comprising:
a processor;
memory in electronic communication with the processor; and
instructions stored in the memory and operable, when executed by the processor, to cause the mobile device to:
perform a first transmission of control information in a control channel during a first transmission time interval (TTI) using a first transmit power;
identify control information of the first transmission to be repeated during a second TTI;
receive downlink control information (DCI) that includes a transmit power control (TPC) command relating to a second transmit power for repeating a transmission of the control information, wherein the DCI is applicable to repeated transmissions of control information scheduled after a fixed delay from a time interval in which the DCI is received;
determine the second transmit power for repeating transmission of the control information during the second TTI based at least in part on the TPC command, wherein the first transmit power is different from the second transmit power; and
repeat the transmission of the control information in the control channel during the second TTI using the determined second transmit power.

16. The mobile device of claim 15, wherein the first transmission of the control information is in a first beam direction, and wherein the instructions are further executable by the processor to:
repeat the transmission of the control information in a second beam direction that is different from the first beam direction.

17. The mobile device of claim 15, wherein the instructions are further executable by the processor to:
identify a first path loss associated with the first transmission of the control information, wherein the first transmit power is determined based at least in part on the first path loss; and
identify a second path loss associated with the repeated transmission of the control information, wherein the second transmit power is determined based at least in part on the second path loss.

18. The mobile device of claim 15, wherein the DCI further indicates whether the TPC command is applicable to the repeated transmission of the control information.

19. The mobile device of claim 18, wherein the DCI further indicates a repeated transmission to which the TPC command applies.

20. The mobile device of claim 15, wherein a first set of one or more step-sizes in the TPC command relating to the second transmit power for repeating the transmission of the control information is different from a second set of one or more step-sizes in another TPC command relating to the first transmit power.

21. The mobile device of claim 15, wherein the instructions are further executable by the processor to:
identify a table in the TPC command that indicates a relationship between step-sizes and repetition indices for repeated transmissions of control information, wherein the second transmit power is determined based at least in part on the table and a repetition index of the repeated transmission.

22. A non-transitory computer readable medium storing code for wireless communication, the code comprising instructions executable by a processor to:
- perform a first transmission of control information in a control channel during a first transmission time interval (TTI) using a first transmit power;
- identify control information of the first transmission to be repeated during a second TTI;
- receive downlink control information (DCI) that includes a transmit power control (TPC) command relating to a second transmit power for repeating a transmission of the control information, wherein the DCI is applicable to repeated transmissions of control information scheduled after a fixed delay from a time interval in which the DCI is received:
- determine the second transmit power for repeating transmission of the control information during the second TTI based at least in part on the TPC command, wherein the first transmit power is different from the second transmit power; and
- repeat the transmission of the control information in the control channel during the second TTI using the determined second transmit power.

23. The non-transitory computer readable medium of claim 22, wherein the first transmission of the control information is in a first beam direction, and wherein the instructions are further executable by the processor to:
- repeat the transmission of the control information in a second beam direction that is different from the first beam direction.

24. The non-transitory computer readable medium of claim 22, wherein the instructions are further executable by the processor to:
- identify a first path loss associated with the first transmission of the control information, wherein the first transmit power is determined based at least in part on the first path loss; and
- identify a second path loss associated with the repeated transmission of the control information, wherein the second transmit power is determined based at least in part on the second path loss.

25. The non-transitory computer readable medium of claim 22, wherein the DCI further indicates whether the TPC command is applicable to the repeated transmission of the control information.

26. The non-transitory computer readable medium of claim 25, wherein the DCI further indicates a repeated transmission to which the TPC command applies.

27. The non-transitory computer readable medium of claim 22, wherein a first set of one or more step-sizes in the TPC command relating to the second transmit power for repeating the transmission of the control information is different from a second set of one or more step-sizes in another TPC command relating to the first transmit power.

28. The non-transitory computer readable medium of claim 22, wherein the instructions are further executable by the processor to:
- identify a table in the TPC command that indicates a relationship between step-sizes and repetition indices for repeated transmissions of control information, wherein the second transmit power is determined based at least in part on the table and a repetition index of the repeated transmission.

* * * * *